US012646347B2

(12) United States Patent
Delgado del Hoyo et al.

(10) Patent No.: US 12,646,347 B2
(45) Date of Patent: Jun. 2, 2026

(54) METHODS, SYSTEMS, ARTICLES OF MANUFACTURE, AND APPARATUS FOR IMAGE RECOGNITION BASED ON VISUAL AND TEXTUAL INFORMATION

(71) Applicant: Nielsen Consumer LLC, Chicago, IL (US)

(72) Inventors: Francisco Javier Delgado del Hoyo, Valladolid (ES); Javier Tovar Velasco, Valladolid (ES); Antonio Hurtado, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 236 days.

(21) Appl. No.: 18/345,708

(22) Filed: Jun. 30, 2023

(65) Prior Publication Data

US 2025/0005947 A1 Jan. 2, 2025

(51) Int. Cl.
*G06V 30/19* (2022.01)
*G06Q 10/087* (2023.01)
(Continued)

(52) U.S. Cl.
CPC ..... *G06V 30/19173* (2022.01); *G06Q 10/087* (2013.01); *G06Q 30/0201* (2013.01);
(Continued)

(58) Field of Classification Search
CPC ................ G06V 10/46; G06V 10/255; G06V 30/19173; G06V 20/63; G06V 20/62;
(Continued)

(56) References Cited

U.S. PATENT DOCUMENTS 7,751,592 B1 * 7/2010 Rosenberg ............ G06F 18/256
709/224
8,989,450 B1 * 3/2015 Rosenberg ............ G06F 18/256
707/706
(Continued)

FOREIGN PATENT DOCUMENTS

CN 113052159 A * 6/2021 ............. G06N 3/045
CN 116030295 A * 4/2023
(Continued)

OTHER PUBLICATIONS

Mafla et al. "Fine-grained Image Classification and Retrieval by Combining Visual and Locally Pooled Textual Features," 2020 IEEE Winter Conference on Applications of Computer Vision (WACV), Snowmass, CO, USA, 2020, pp. 2939-2948, doi: 10.1109/WACV45572.2020.9093373 (Year: 2020).*
(Continued)

*Primary Examiner* — John Villecco
(74) *Attorney, Agent, or Firm* — Hanley, Flight & Zimmerman, LLC

(57) ABSTRACT

Systems, apparatus, articles of manufacture, and methods are disclosed that recognize products using visual and textual information. An example apparatus includes classification circuitry to classify object facings detected in a shelf image to determine object candidates corresponding to a first object, ones of the object candidates to include a respective image-based metric; cluster circuitry to assign words extracted from the shelf image to the first object; rank adjuster circuitry to generate text-based metrics for the object candidates by comparing respective object characteristics of the object candidates to the words, ones of the text-based metrics corresponding to respective ones of the object candidates; and prediction circuitry to determine final metrics for the object candidates by selecting, for the ones of the object candidates, (a) a respective image-based metric
(Continued)

or (b) a combination of the respective image-based metric and a respective text-based metric; and rank the object candidates using the final metrics.

20 Claims, 16 Drawing Sheets

(51) Int. Cl.
| | |
|---|---|
| *G06Q 30/0201* | (2023.01) |
| *G06V 10/46* | (2022.01) |
| *G06V 20/62* | (2022.01) |

(52) U.S. Cl.
CPC .............. *G06V 10/46* (2022.01); *G06V 20/63* (2022.01); *G06V 30/19093* (2022.01); *G06V 30/19107* (2022.01)

(58) Field of Classification Search
CPC ....... G06V 30/19093; G06V 30/19107; G06V 10/70; G06V 10/464; G06V 10/764; G06V 10/82; G06V 20/41; G06V 20/68; G06V 20/70; G06V 20/80; G06Q 10/087
See application file for complete search history.

(56) References Cited

U.S. PATENT DOCUMENTS

| | | | | |
|---|---|---|---|---|
| 9,984,451 | B2 * | 5/2018 | Gormish | G06F 18/22 |
| 10,282,462 | B2 * | 5/2019 | Magnani | G06N 3/08 |
| 10,445,870 | B2 * | 10/2019 | Gormish | G06F 18/23 |
| 10,452,924 | B2 * | 10/2019 | Adato | H04N 23/60 |
| 10,521,645 | B2 * | 12/2019 | Adato | G07G 1/0036 |
| 10,521,646 | B2 * | 12/2019 | Adato | G06F 17/18 |
| 10,546,182 | B2 * | 1/2020 | Adato | G06Q 10/06311 |
| 10,558,843 | B2 * | 2/2020 | Adato | G06V 40/10 |
| 10,625,426 | B2 * | 4/2020 | Bogolea | B25J 11/008 |
| 10,628,660 | B2 * | 4/2020 | Adato | G07G 1/0036 |
| 10,643,059 | B2 * | 5/2020 | Adato | G06T 7/70 |
| 10,643,060 | B2 * | 5/2020 | Adato | G06Q 10/08 |
| 10,664,722 | B1 * | 5/2020 | Sharma | G06F 18/22 |
| 10,671,834 | B2 * | 6/2020 | Adato | G06V 40/10 |
| 10,762,330 | B2 * | 9/2020 | Adato | G06T 7/55 |
| 10,846,512 | B2 * | 11/2020 | Adato | G06F 17/18 |
| 10,902,240 | B2 * | 1/2021 | Adato | G06V 20/20 |
| 10,949,460 | B2 * | 3/2021 | Li | G06F 16/5838 |
| 10,956,711 | B2 * | 3/2021 | Adato | G06F 16/90335 |
| 11,151,425 | B2 * | 10/2021 | Almazán | G06F 18/214 |
| 11,275,948 | B2 * | 3/2022 | Rao | G06F 18/24 |
| 11,354,916 | B2 * | 6/2022 | Adato | G06Q 10/0875 |
| 11,398,089 | B1 * | 7/2022 | Jindal | G06V 10/82 |
| 11,544,508 | B2 * | 1/2023 | Almazan | G06V 10/22 |
| 11,562,581 | B2 * | 1/2023 | Adato | G06F 16/583 |
| 11,694,440 | B2 * | 7/2023 | Jindal | G06V 20/63 |
| | | | | 345/107 |
| 11,714,849 | B2 * | 8/2023 | Zhou | G06V 10/7788 |
| | | | | 382/100 |
| 11,983,247 | B2 * | 5/2024 | Almazan | G06V 20/62 |
| 12,118,046 | B2 * | 10/2024 | Gokhan | G06V 10/40 |
| 12,229,805 | B2 * | 2/2025 | Martínez Cebrián et al. | |
| | | | | G06F 16/5846 |
| 12,277,786 | B2 * | 4/2025 | Arroyo | G06V 30/153 |
| 2016/0171707 | A1 * | 6/2016 | Schwartz | G06F 18/22 |
| | | | | 382/180 |
| 2017/0178310 | A1 * | 6/2017 | Gormish | G06T 7/30 |
| 2017/0278057 | A1 * | 9/2017 | Itou | G06K 19/06103 |
| 2018/0005035 | A1 * | 1/2018 | Bogolea | G06V 20/20 |
| 2018/0121533 | A1 * | 5/2018 | Magnani | G06N 3/045 |
| 2018/0300043 | A1 * | 10/2018 | Graham | G06V 10/42 |
| 2019/0034864 | A1 * | 1/2019 | Skaff | G06Q 10/087 |
| 2019/0065589 | A1 * | 2/2019 | Wen | G06F 16/353 |
| 2019/0213421 | A1 * | 7/2019 | Adato | G07G 1/0036 |
| 2019/0213523 | A1 * | 7/2019 | Adato | G06Q 20/203 |
| 2019/0213534 | A1 * | 7/2019 | Adato | G06F 17/18 |
| 2019/0213535 | A1 * | 7/2019 | Adato | G06F 16/235 |
| 2019/0213545 | A1 * | 7/2019 | Adato | G06Q 10/063112 |
| 2019/0213546 | A1 * | 7/2019 | Adato | G08B 21/182 |
| 2019/0213752 | A1 * | 7/2019 | Adato | G06F 16/23 |
| 2019/0215424 | A1 * | 7/2019 | Adato | G07G 1/0036 |
| 2019/0311210 | A1 * | 10/2019 | Chatterjee | G06N 3/045 |
| 2019/0392379 | A1 * | 12/2019 | O'Brien | G06Q 10/087 |
| 2020/0019754 | A1 * | 1/2020 | Adato | G06T 7/75 |
| 2020/0117884 | A1 * | 4/2020 | Adato | G06T 7/20 |
| 2020/0151421 | A1 * | 5/2020 | Adato | G06F 16/23 |
| 2020/0215698 | A1 * | 7/2020 | Bogolea | B25J 11/008 |
| 2021/0042502 | A1 * | 2/2021 | Adato | G06T 7/521 |
| 2021/0110139 | A1 * | 4/2021 | Adato | G06T 7/55 |
| 2021/0166028 | A1 * | 6/2021 | Ramenahalli Govindaraju | |
| | | | | G06V 20/52 |
| 2022/0019734 | A1 * | 1/2022 | Kurma | G06V 10/764 |
| 2022/0058425 | A1 * | 2/2022 | Savvides | G06F 16/56 |
| 2022/0114394 | A1 * | 4/2022 | Mustafi | G06F 18/217 |
| 2022/0114821 | A1 * | 4/2022 | Arroyo | G06V 30/1448 |
| 2022/0156488 | A1 * | 5/2022 | Mokhtari | G06F 40/284 |
| 2022/0164607 | A1 * | 5/2022 | Almazan | G06F 18/2415 |
| 2023/0034495 | A1 * | 2/2023 | Chaudry | G06Q 30/0643 |
| 2023/0088925 | A1 * | 3/2023 | Sharma | G06F 18/2431 |
| | | | | 382/156 |
| 2023/0131517 | A1 * | 4/2023 | Bogolea | B25J 11/008 |
| | | | | 705/28 |
| 2023/0274226 | A1 * | 8/2023 | Patil | G06V 10/82 |
| | | | | 705/28 |
| 2024/0273463 | A1 * | 8/2024 | Pachauri | G06V 10/7715 |
| 2024/0273863 | A1 * | 8/2024 | Ghosh | G06Q 10/087 |

FOREIGN PATENT DOCUMENTS

| | | | | | |
|---|---|---|---|---|---|
| JP | 2020004425 | A | * | 1/2020 | |
| KR | 20240102321 | A | * | 7/2024 | G06F 16/434 |
| WO | WO-2016137390 | A1 | * | 9/2016 | G06V 10/768 |

OTHER PUBLICATIONS

Bakkali et al.; "Visual and Textual Deep Feature Fusion for Document Image Classification," 2020 IEEE/CVF Conference on Computer Vision and Pattern Recognition Workshops (CVPRW), Seattle, WA, USA, 2020, pp. 2394-2403, doi: 10.1109/CVPRW50498.2020.00289. (Year: 2020).*

Karaoglu et al.; "Con-Text: Text Detection for Fine-Grained Object Classification," in IEEE Transactions on Image Processing, vol. 26, No. 8, pp. 3965-3980, Aug. 2017, doi: 10.1109/TIP.2017.2707805. (Year: 2017).*

H. Wang et al., "Knowledge Mining with Scene Text for Fine-Grained Recognition," 2022 IEEE/CVF Conference on Computer Vision and Pattern Recognition (CVPR), New Orleans, LA, USA, 2022, pp. 4614-4623, doi: 10.1109/CVPR52688.2022.00458. (Year: 2022).*

A. Mafla, S. Dey, A. F. Biten, L. Gomez and D. Karatzas, "Multi-Modal Reasoning Graph for Scene-Text Based Fine-Grained Image Classification and Retrieval," 2021 IEEE Winter Conference on Applications of Computer Vision (WACV), Waikoloa, HI, USA, 2021, pp. 4022-4032, doi: 10.1109/WACV48630.2021.00407. (Year: 2021).*

Fine grained (Year: 2020).*

Bai et al., "Integrating Scene Text and Visual Appearance for Fine-Grained Image Classification," IEEE Access, 6, 66322-66335, dated May 30, 2017, 12 pages.

Ferger, W.F., "The Nature and Use of the Harmonic Mean," Journal of the American Statistical Association, 26 (173), 36-40, Mar. 1931, 6 pages.

Krizhevsky et al., "ImageNet Classification with Deep Convolutional Neural Networks," In International Conference on Neural Information Processing Systems (NIPS), 1106-1114, 2012, 9 pages.

Google OCR, Google Cloud Vision API, Detect Text (OCR), 2022, 17 pages. [available online: https://cloud.google.com/vision/docs/ocr].

Vaswani et al., "Attention Is All You Need," In Advances in Neural Information Processing Systems (30), dated Dec. 6, 2017, 15 pages.

(56)          References Cited

OTHER PUBLICATIONS

Levenshtein, "Binary Codes Capable of Correcting Deletions, Insertions, and Reversals," Soviet Physics Doklady, Cybernetics and Control Theory, vol. 10, No. 8, dated Feb. 1966, 4 pages.
European Patent Office, "Extended European Search Report," issued in connection with European Patent Application No. 24185053.6, dated Nov. 26, 2024, 5 pages.
Yujian et al., "A Normalized Levenshtein Distance Metric," IEEE Transactions on Pattern Analysis and Machine Intelligence, vol. 29, No. 6, Jun. 2007, 5 pages.
Yun et al., "An Improved TF-IDF Approach for Text Classification," Journal of Zhejiang University-Science A, 6(1), 49-55, 2005, 7 pages.
Ramos, "Using TF-IDF to Determine Word Relevance in Document Queries," in Proceedings of the first instructional conference on machine learning, 2003, 4 pages.
Trax, "The Trax Computer Vision Platform," Apr. 2018, Retrieved on Oct. 3, 2025 from https://web.archive.org/web/20221130002542/https://traxretail.com/resources/trax-computer-vision-platform/, 2 pages.

* cited by examiner

600

700

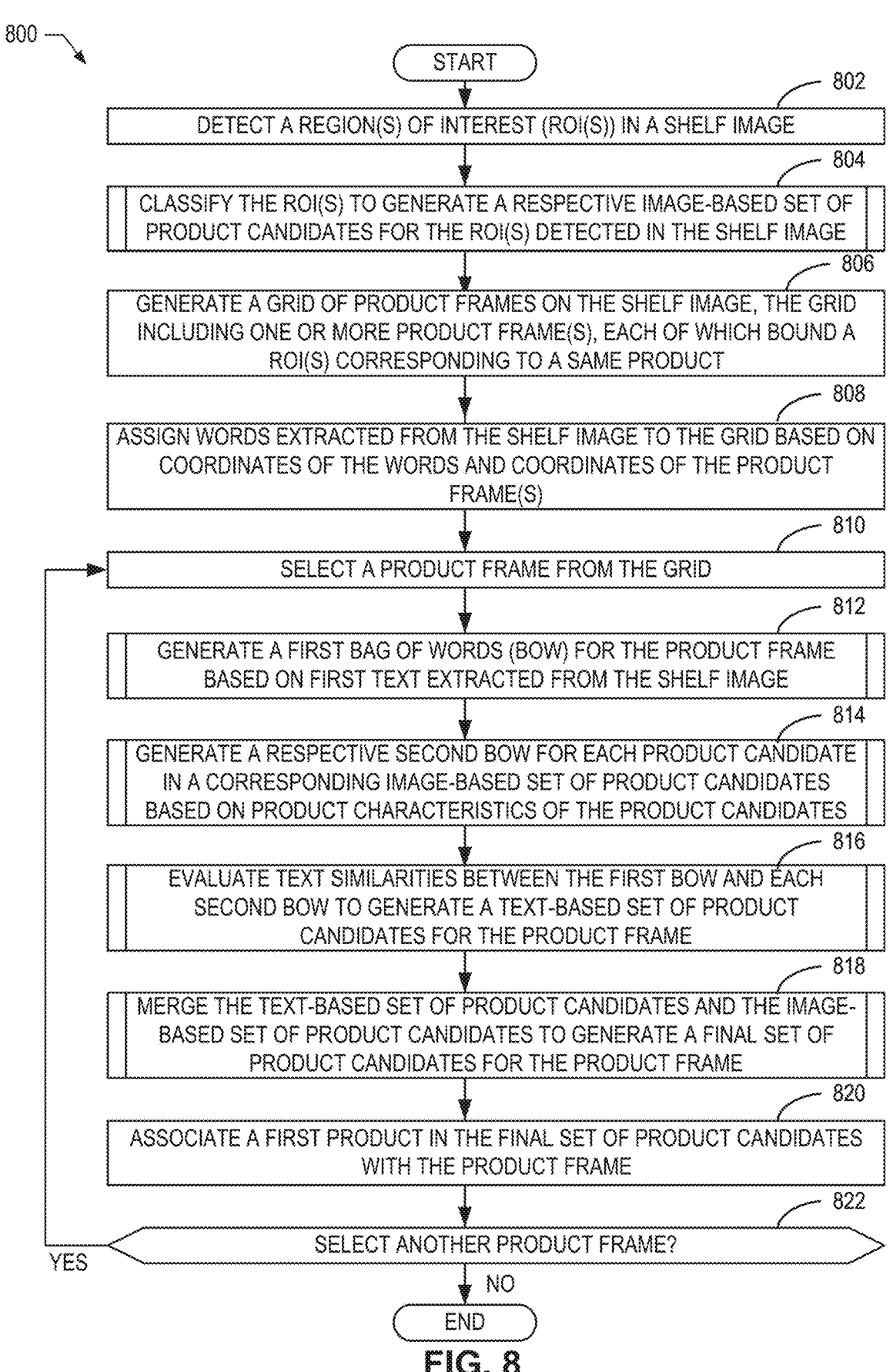

800

START

802
DETECT A REGION(S) OF INTEREST (ROI(S)) IN A SHELF IMAGE

804
CLASSIFY THE ROI(S) TO GENERATE A RESPECTIVE IMAGE-BASED SET OF PRODUCT CANDIDATES FOR THE ROI(S) DETECTED IN THE SHELF IMAGE

806
GENERATE A GRID OF PRODUCT FRAMES ON THE SHELF IMAGE, THE GRID INCLUDING ONE OR MORE PRODUCT FRAME(S), EACH OF WHICH BOUND A ROI(S) CORRESPONDING TO A SAME PRODUCT

808
ASSIGN WORDS EXTRACTED FROM THE SHELF IMAGE TO THE GRID BASED ON COORDINATES OF THE WORDS AND COORDINATES OF THE PRODUCT FRAME(S)

810
SELECT A PRODUCT FRAME FROM THE GRID

812
GENERATE A FIRST BAG OF WORDS (BOW) FOR THE PRODUCT FRAME BASED ON FIRST TEXT EXTRACTED FROM THE SHELF IMAGE

814
GENERATE A RESPECTIVE SECOND BOW FOR EACH PRODUCT CANDIDATE IN A CORRESPONDING IMAGE-BASED SET OF PRODUCT CANDIDATES BASED ON PRODUCT CHARACTERISTICS OF THE PRODUCT CANDIDATES

816
EVALUATE TEXT SIMILARITIES BETWEEN THE FIRST BOW AND EACH SECOND BOW TO GENERATE A TEXT-BASED SET OF PRODUCT CANDIDATES FOR THE PRODUCT FRAME

818
MERGE THE TEXT-BASED SET OF PRODUCT CANDIDATES AND THE IMAGE-BASED SET OF PRODUCT CANDIDATES TO GENERATE A FINAL SET OF PRODUCT CANDIDATES FOR THE PRODUCT FRAME

820
ASSOCIATE A FIRST PRODUCT IN THE FINAL SET OF PRODUCT CANDIDATES WITH THE PRODUCT FRAME

822
SELECT ANOTHER PRODUCT FRAME?

YES

NO

END

FIG. 8

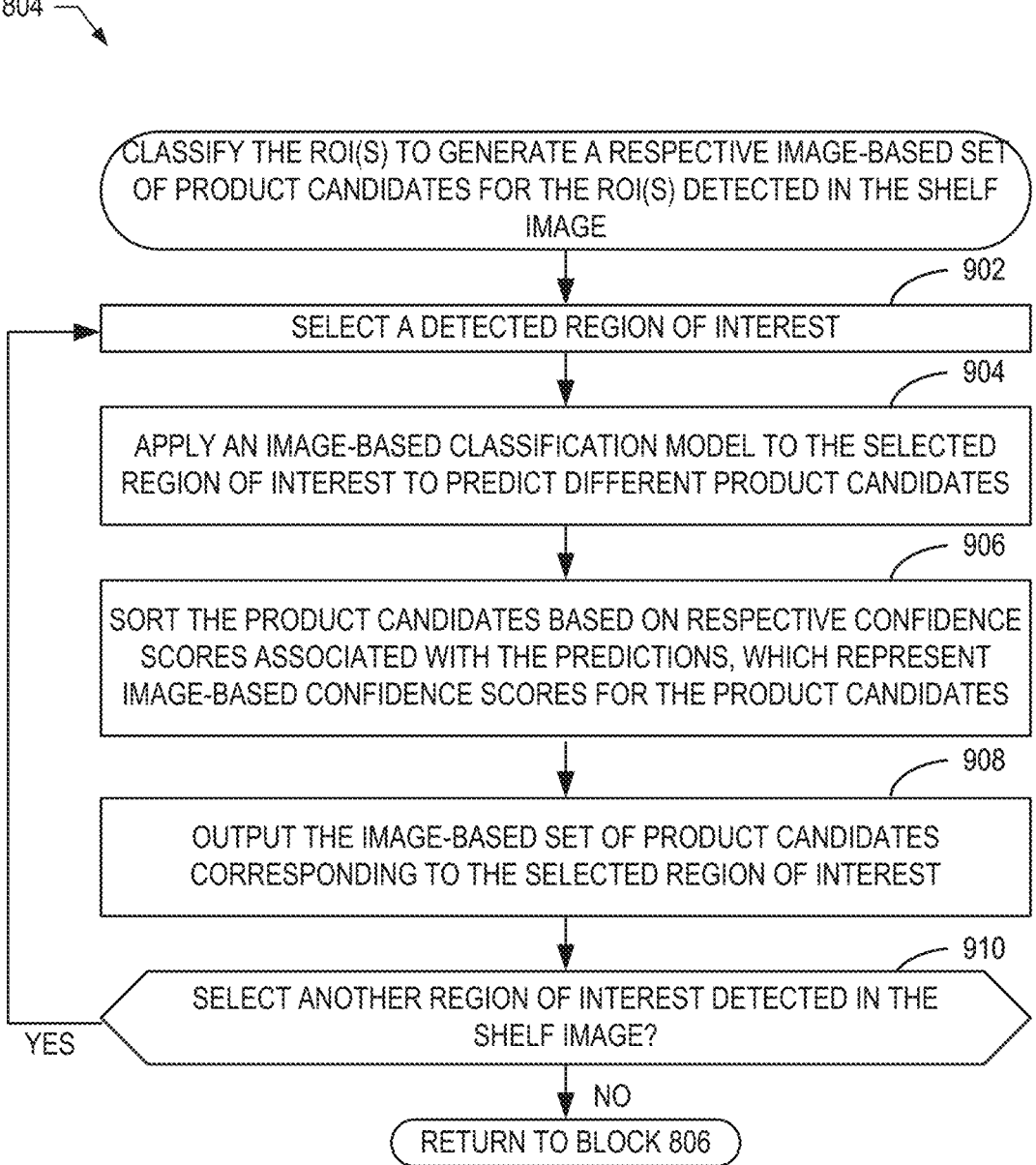

804

CLASSIFY THE ROI(S) TO GENERATE A RESPECTIVE IMAGE-BASED SET OF PRODUCT CANDIDATES FOR THE ROI(S) DETECTED IN THE SHELF IMAGE

902

SELECT A DETECTED REGION OF INTEREST

904

APPLY AN IMAGE-BASED CLASSIFICATION MODEL TO THE SELECTED REGION OF INTEREST TO PREDICT DIFFERENT PRODUCT CANDIDATES

906

SORT THE PRODUCT CANDIDATES BASED ON RESPECTIVE CONFIDENCE SCORES ASSOCIATED WITH THE PREDICTIONS, WHICH REPRESENT IMAGE-BASED CONFIDENCE SCORES FOR THE PRODUCT CANDIDATES

908

OUTPUT THE IMAGE-BASED SET OF PRODUCT CANDIDATES CORRESPONDING TO THE SELECTED REGION OF INTEREST

910

SELECT ANOTHER REGION OF INTEREST DETECTED IN THE SHELF IMAGE?

YES

NO

RETURN TO BLOCK 806

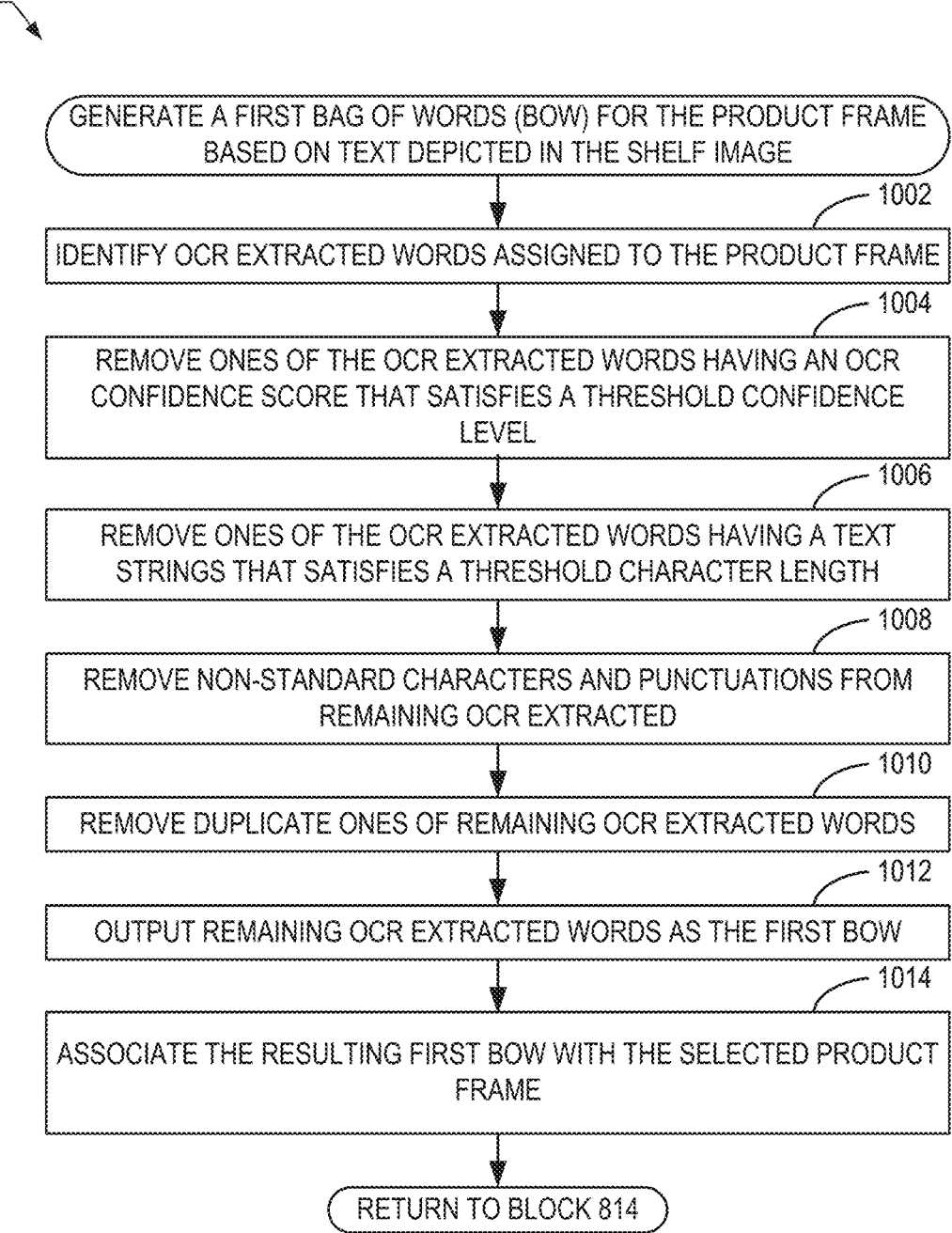

GENERATE A FIRST BAG OF WORDS (BOW) FOR THE PRODUCT FRAME BASED ON TEXT DEPICTED IN THE SHELF IMAGE

1002

IDENTIFY OCR EXTRACTED WORDS ASSIGNED TO THE PRODUCT FRAME

1004

REMOVE ONES OF THE OCR EXTRACTED WORDS HAVING AN OCR CONFIDENCE SCORE THAT SATISFIES A THRESHOLD CONFIDENCE LEVEL

1006

REMOVE ONES OF THE OCR EXTRACTED WORDS HAVING A TEXT STRINGS THAT SATISFIES A THRESHOLD CHARACTER LENGTH

1008

REMOVE NON-STANDARD CHARACTERS AND PUNCTUATIONS FROM REMAINING OCR EXTRACTED

1010

REMOVE DUPLICATE ONES OF REMAINING OCR EXTRACTED WORDS

1012

OUTPUT REMAINING OCR EXTRACTED WORDS AS THE FIRST BOW

1014

ASSOCIATE THE RESULTING FIRST BOW WITH THE SELECTED PRODUCT FRAME

RETURN TO BLOCK 814

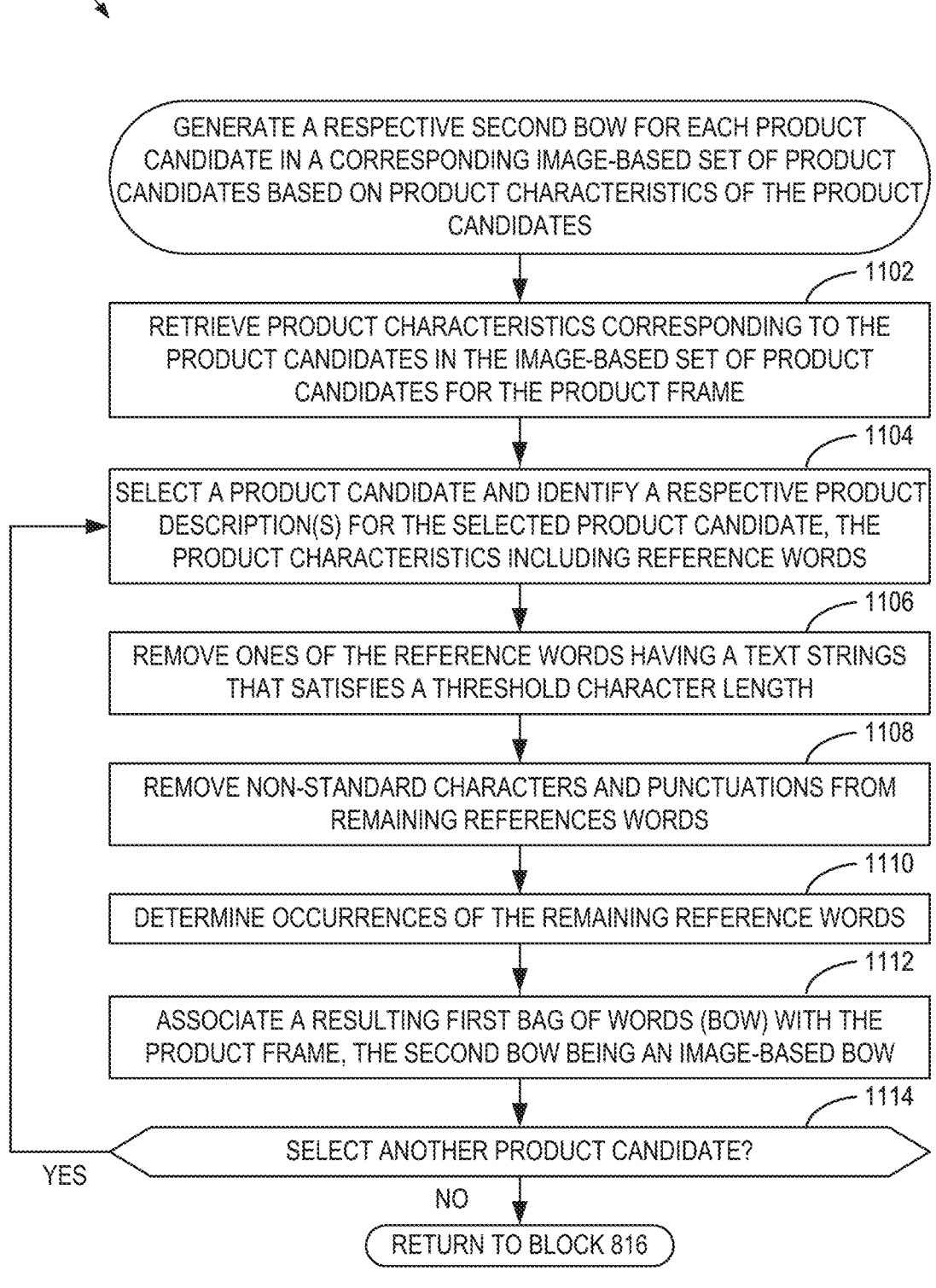

GENERATE A RESPECTIVE SECOND BOW FOR EACH PRODUCT CANDIDATE IN A CORRESPONDING IMAGE-BASED SET OF PRODUCT CANDIDATES BASED ON PRODUCT CHARACTERISTICS OF THE PRODUCT CANDIDATES

1102

RETRIEVE PRODUCT CHARACTERISTICS CORRESPONDING TO THE PRODUCT CANDIDATES IN THE IMAGE-BASED SET OF PRODUCT CANDIDATES FOR THE PRODUCT FRAME

1104

SELECT A PRODUCT CANDIDATE AND IDENTIFY A RESPECTIVE PRODUCT DESCRIPTION(S) FOR THE SELECTED PRODUCT CANDIDATE, THE PRODUCT CHARACTERISTICS INCLUDING REFERENCE WORDS

1106

REMOVE ONES OF THE REFERENCE WORDS HAVING A TEXT STRINGS THAT SATISFIES A THRESHOLD CHARACTER LENGTH

1108

REMOVE NON-STANDARD CHARACTERS AND PUNCTUATIONS FROM REMAINING REFERENCES WORDS

1110

DETERMINE OCCURRENCES OF THE REMAINING REFERENCE WORDS

1112

ASSOCIATE A RESULTING FIRST BAG OF WORDS (BOW) WITH THE PRODUCT FRAME, THE SECOND BOW BEING AN IMAGE-BASED BOW

1114

SELECT ANOTHER PRODUCT CANDIDATE?

YES

NO

RETURN TO BLOCK 816

FIG. 11

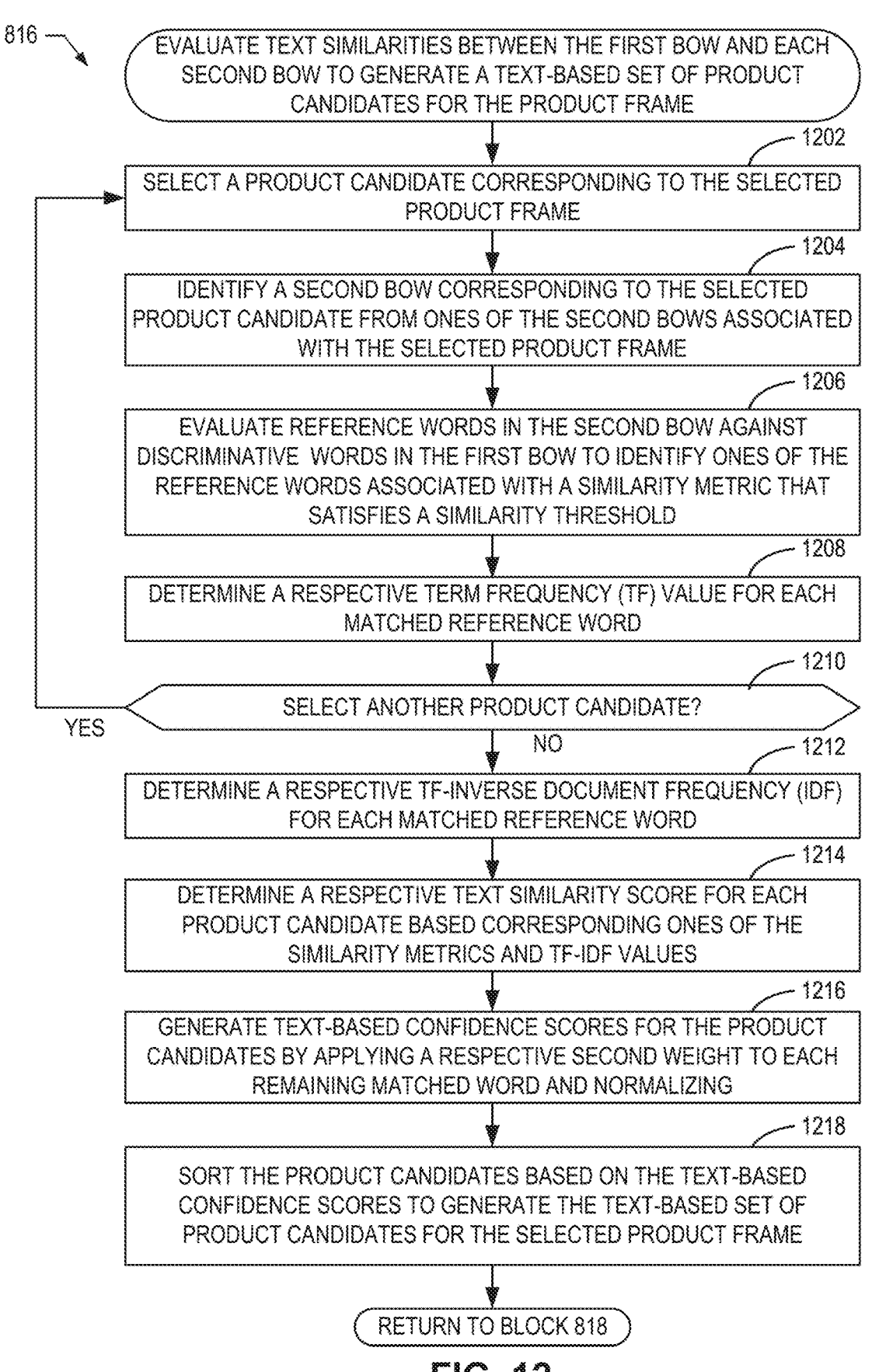

816

EVALUATE TEXT SIMILARITIES BETWEEN THE FIRST BOW AND EACH SECOND BOW TO GENERATE A TEXT-BASED SET OF PRODUCT CANDIDATES FOR THE PRODUCT FRAME

1202

SELECT A PRODUCT CANDIDATE CORRESPONDING TO THE SELECTED PRODUCT FRAME

1204

IDENTIFY A SECOND BOW CORRESPONDING TO THE SELECTED PRODUCT CANDIDATE FROM ONES OF THE SECOND BOWS ASSOCIATED WITH THE SELECTED PRODUCT FRAME

1206

EVALUATE REFERENCE WORDS IN THE SECOND BOW AGAINST DISCRIMINATIVE WORDS IN THE FIRST BOW TO IDENTIFY ONES OF THE REFERENCE WORDS ASSOCIATED WITH A SIMILARITY METRIC THAT SATISFIES A SIMILARITY THRESHOLD

1208

DETERMINE A RESPECTIVE TERM FREQUENCY (TF) VALUE FOR EACH MATCHED REFERENCE WORD

1210

SELECT ANOTHER PRODUCT CANDIDATE?

YES

NO

1212

DETERMINE A RESPECTIVE TF-INVERSE DOCUMENT FREQUENCY (IDF) FOR EACH MATCHED REFERENCE WORD

1214

DETERMINE A RESPECTIVE TEXT SIMILARITY SCORE FOR EACH PRODUCT CANDIDATE BASED CORRESPONDING ONES OF THE SIMILARITY METRICS AND TF-IDF VALUES

1216

GENERATE TEXT-BASED CONFIDENCE SCORES FOR THE PRODUCT CANDIDATES BY APPLYING A RESPECTIVE SECOND WEIGHT TO EACH REMAINING MATCHED WORD AND NORMALIZING

1218

SORT THE PRODUCT CANDIDATES BASED ON THE TEXT-BASED CONFIDENCE SCORES TO GENERATE THE TEXT-BASED SET OF PRODUCT CANDIDATES FOR THE SELECTED PRODUCT FRAME

RETURN TO BLOCK 818

FIG. 12

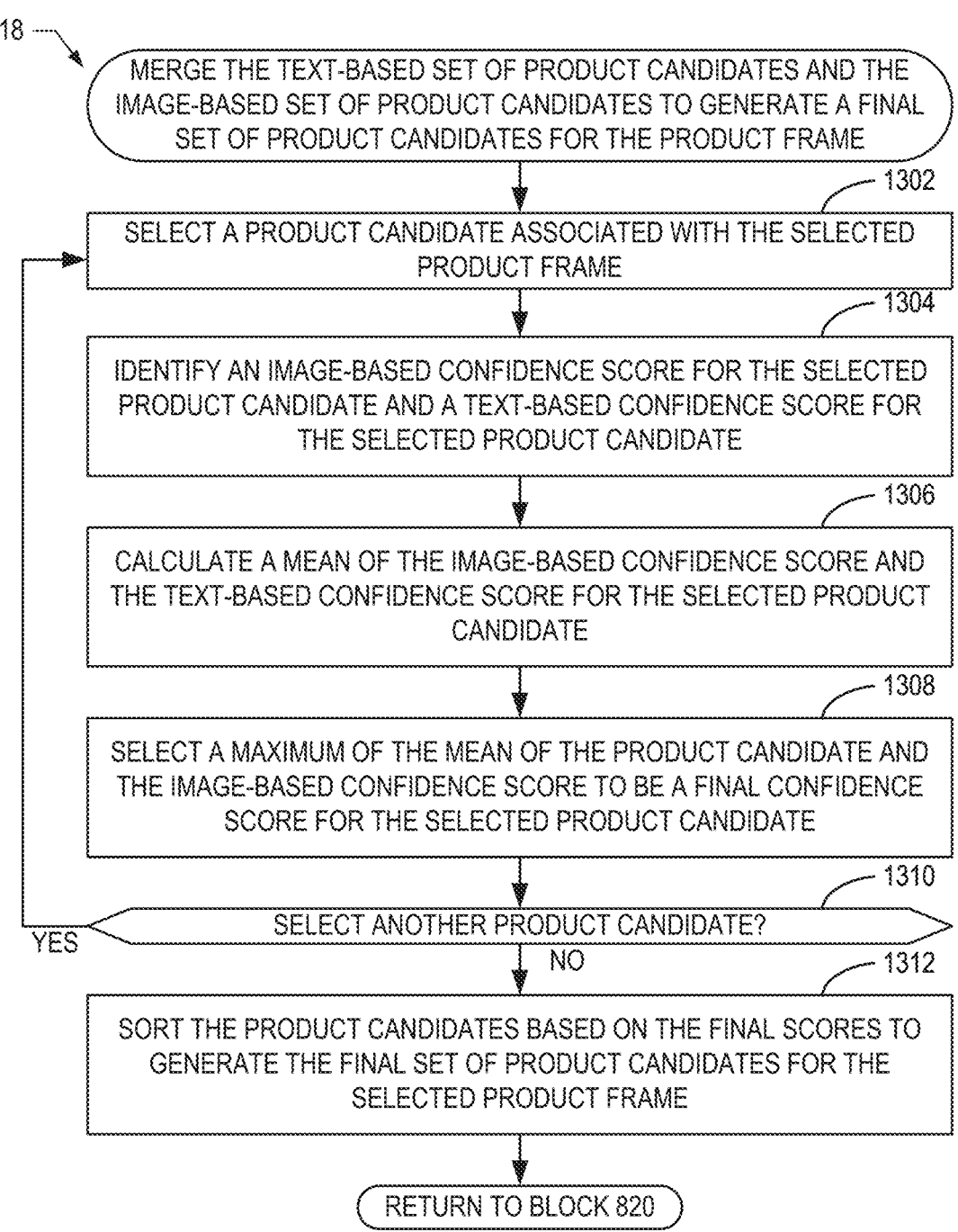

818 —

MERGE THE TEXT-BASED SET OF PRODUCT CANDIDATES AND THE IMAGE-BASED SET OF PRODUCT CANDIDATES TO GENERATE A FINAL SET OF PRODUCT CANDIDATES FOR THE PRODUCT FRAME

1302
SELECT A PRODUCT CANDIDATE ASSOCIATED WITH THE SELECTED PRODUCT FRAME

1304
IDENTIFY AN IMAGE-BASED CONFIDENCE SCORE FOR THE SELECTED PRODUCT CANDIDATE AND A TEXT-BASED CONFIDENCE SCORE FOR THE SELECTED PRODUCT CANDIDATE

1306
CALCULATE A MEAN OF THE IMAGE-BASED CONFIDENCE SCORE AND THE TEXT-BASED CONFIDENCE SCORE FOR THE SELECTED PRODUCT CANDIDATE

1308
SELECT A MAXIMUM OF THE MEAN OF THE PRODUCT CANDIDATE AND THE IMAGE-BASED CONFIDENCE SCORE TO BE A FINAL CONFIDENCE SCORE FOR THE SELECTED PRODUCT CANDIDATE

1310
SELECT ANOTHER PRODUCT CANDIDATE?

YES                    NO

1312
SORT THE PRODUCT CANDIDATES BASED ON THE FINAL SCORES TO GENERATE THE FINAL SET OF PRODUCT CANDIDATES FOR THE SELECTED PRODUCT FRAME

RETURN TO BLOCK 820

FIG. 13

METHODS, SYSTEMS, ARTICLES OF MANUFACTURE, AND APPARATUS FOR IMAGE RECOGNITION BASED ON VISUAL AND TEXTUAL INFORMATION

FIELD OF THE DISCLOSURE

This disclosure relates generally to computer-based image analysis and, more particularly, to methods, systems, articles of manufacture, and apparatus for image recognition based on visual and textual information.

BACKGROUND

Artificial intelligence (AI) leverages computers and machines to mimic problem solving and decision making challenges that typically require human intelligence. Artificial intelligence models enable analysts to solve challenging business use cases in the technical fields of data collection and market research. For example, image recognition can be used to identify consumer packaged goods for a variety of purposes, such as performing an in-store shelf audit.

BRIEF DESCRIPTION OF THE DRAWINGS

FIGS. 8-13 are flowcharts representative of example machine readable instructions and/or example operations that may be executed, instantiated, and/or performed by example programmable circuitry to implement the product recognition circuitry 104 of FIGS. 1-3.

Figure 1:
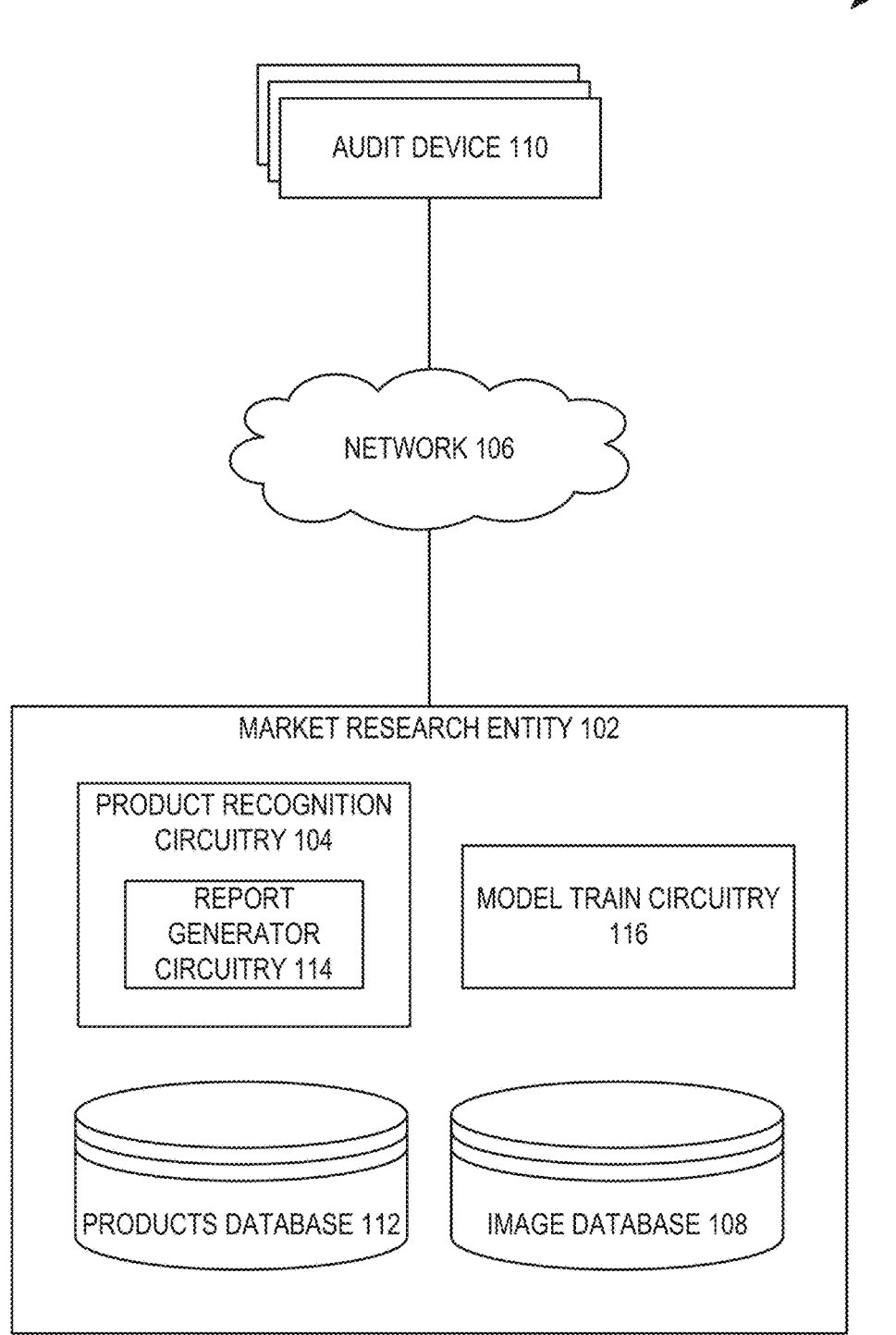
FIG. 1 is a block diagram of an example environment in which example product recognition circuitry operates to recognize products in images.

In general, the same reference numbers will be used throughout the drawing(s) and accompanying written description to refer to the same or like parts. The figures are not necessarily to scale. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

DETAILED DESCRIPTION

Market research entities desire to provide market participants (e.g., manufacturers, retailers, marketers, etc.) with accurate and actionable information to facilitate achievement of business goals, such as improving sales. For example, the market research entity can offer services based on recognition of consumer packaged goods (e.g., products, items, objects, etc.) from images of store shelves (e.g., shelf images, etc.), a task hereinafter referred to as shelf auditing. Shelf auditing can be used to identify, for example, quantities and/or types of products in inventory, display locations of products, whether shelves need to be restocked, whether display quality requirements are satisfied (e.g., the goods are facing the correct orientation, the shelf is fully stocked, etc.), etc. Additionally or alternatively, shelf auditing can be used to assess product arrangements and displays, to determine a frequency with which products need restocking, etc.

While examples disclosed herein consider a use case scenario within a retail industry, such example technical solutions to perform image recognition based on visual and textual information are not limited thereto. For instance, examples disclosed herein include technical solutions to improve safety in a pharmaceutical use case scenario to verify stock medications are properly located in particular locations of a pharmaceutical stock room. In some examples, human-based stock replenishing activities place particular medication shipment containers in incorrect locations of a pharmaceutical stock room, thereby increasing the possibility that a patient will receive an incorrect medication (e.g., a pharmacist will incorrectly fulfill a prescription, a medical provider will incorrectly mediate a patient, etc.). As such, examples disclosed herein improve safety by verifying proper medication packages/objects are located in particular areas of a pharmaceutical stock room. In some examples, after detecting that one or more objects of a shelf are erroneously located, examples disclosed herein invoke one or more corrective actions to remedy a situation that could otherwise prove to be unsafe (e.g., incorrect medications provided to patients). In some examples disclosed herein, notifications are generated as text messages and/or e-mail messages to personnel, in which the messages verify proper or improper shelf objects for one or more particular shelves.

The market research entity can analyze a shelf image captured by an auditor(s) (e.g., a human, a drone, etc.) and attempt to detect and identify objects within those images. For example, an auditor(s) can visit a store and capture images of shelves in the store using, for example, a camera, smartphone, tablet, video recorder, etc. The auditor(s) provides the shelf images to the market research entity to extract actionable insights about assortment, product placement, prices, promotions, consumer demands and trends, stock, etc. In some examples, shelf images are captured by security cameras within a facility. For instance, in the pharmaceutical industry, security cameras are pointed at stock room shelves to prevent theft and/or misuse of particular medications, particularly those classified as narcotic analgesics to relieve pain. As such, examples disclosed herein may leverage image capture resources that are already installed in facilities of interest. In other words, information pertaining to an inventory of products (e.g., objects) in the brick-and-mortar channel can be gathered from the shelf images and used to identify information about marketing, product display, proper placement/location, and/or consumer trends.

The market research entity can take advantage of image recognition techniques to identify products in the shelf images. Image recognition involves analyzing an image(s) using one or more artificial intelligence (AI) models (e.g., a machine learning model, a neural network model, etc.) that detect and/or recognize objects (e.g., items, products, etc.) in the image(s). For example, a first AI model can be trained and executed to detect product facings corresponding to products in shelf images, and a second AI model (e.g., a classifier) can be trained and executed to generate predictions based on the product facings. Such predictions can include, but are not limited to, a product identifier(s) (e.g., a numeric identifier, an alphanumeric identifier, a universal product code (UPC), a European Article Number (EAN), a stock keeping unit (SKU), etc.). In particular, the first and second AI models are based on computer vision (CV) technology, which is a field of AI that trains machines to interpret and understand an image.

As used herein, a facing (e.g., a product facing, a packing, a product packing, etc.) refers to a container, wrapper, and/or other form of storing an object (e.g., a product) as depicted in a shelf image. In some examples, a facing includes one or more product labels (e.g., package labels, etc.) providing details that can influence a consumer's buying decisions, indicate important information (e.g., allergens, dosages of medications, etc.). In other words, a facing is an information tag(s), wrapper(s), seal(s), imprinted message(s), etc. depicting important information about a corresponding product such as (but not limited to) a brand logo, a brand name, an image, a product description (e.g., a flavor, a size, a scent, ingredients, weight, usage instructions, etc.), industry-related information (e.g., a grade, an industry standard tag, allergy information, etc.), marketing information (e.g., discounts, offers, attractive illustrations or textual communication messages that align with marketing strategies, etc.), legal information (e.g., certifications, grading, nutrition facts, etc.), a product identifier (e.g., a container shape), and/or other information that aids in product recognition and differentiation.

Advantageously, applying AI models to detect and classify products from images requires little to no human intervention. As such, automated classification of the images based on the AI models can generally be executed in less time compared to prior techniques that relied on a workforce (e.g., a user, an operator, a technician, a human, etc.) to manually review the images. In particular, some prior techniques to recognize products in images have proven to be time-consuming and error-prone due to inconsistencies across different human auditors and/or inconsistencies of a same human auditor over time. Moreover, thousands of images of supermarket shelves are collected each week by auditors around the world, meaning that a volume of shelf images that need to be processed is often too great to be practically processed on a manual basis, especially in a fast and efficient manner to enable meaningful intelligence with actionable insights.

While generally effective in most situations, some prior automatic image recognition CV-based models fail to detect all of the products in the image and/or incorrectly identify products. This is especially true in fine-grained recognition where two products are slightly different variants of each other. For example, two products may be similar in appearance, but differ in an attribute, such as (but not limited to) volume (e.g., a 2.2 liter cola and a 2 liter cola, a 100 milligram medication and a 200 milligram medication, etc.). Due to the similarity of visual features of text across product variants, CV-based AI models perform considerably worse on such fine-grained text recognition relative to their performance on visual feature recognition. In other words, recognition of products based solely on visual features is limited in terms of quality and/or quantity due to the discriminative power that CV technology can achieve. These challenges cause a decrease in the effectiveness and efficiency of traditional decoding of shelf images.

To ensure high accuracy output, prior techniques utilized a workforce to manually review a shelf image(s) to verify that all of the products in the shelf image(s) have been detected and/or that all of the products are correctly identified. In some examples, the workforce needs to identify an object(s) (e.g., a product facing(s)) in a shelf image(s) by manually searching through a database containing thousands to millions of products and assigning product identifier to the product facing(s). This process of manually reviewing such a large amount of products in a database to assign product identifiers to product facings requires significant time (e.g., high labor costs), processing resources, and/or experience on behalf of the workforce. In addition, human involvement still exhibits erroneous and/or biased results, leading to reduced accuracy.

Moreover, human involvement has been shown to cause significant problems with processing time due to the vast quantity of candidate products to consider. A cost of a shelf audit deliverable that is generated based on traditional CV product recognition techniques is highly dependent on the manual labor required to code the products. Any degree of automation and/or the elimination of human discretionary input applied to the decoding process could have a large impact on the productivity, accuracy, digitalization, safety, and/or profits of particular entities (e.g., market research entities, pharmaceutical entities, hospitals and/or other care facilities, market participants, etc.).

Example methods, systems, articles of manufacture, and apparatus are disclosed herein to recognize products in images using visual and textual information. Examples disclosed herein combine CV and natural language processing (NLP) techniques to facilitate multi-modal image recognition that can be applied to extract relevant data (e.g., product-related data, drug-related data, etc.) from an image. NLP is another powerful tool in the field of AI that is concerned with giving computers the ability to understand human language as it is written. Applying these AI techniques to the extraction of information from images improves productivity of marketing research entities and facilitates their digitalization, resulting in more cost-effective processes.

Example product recognition disclosed herein includes at least applications of (a) CV techniques to detect and classify product facings in a shelf image, (b) information retrieval techniques to retrieve product (e.g., object, item, etc.) characteristics corresponding to the classified product facings, and (c) NLP techniques to extract text that is to be compared to the retrieved product characteristics to determine text similarity. Examples disclosed herein use CV techniques to recognize products in a shelf image by detecting product facings in the shelf image (e.g., via object detection techniques). For each detected product facing, disclosed examples match the respective product facing with one or more products coded and stored in a reference information system (e.g., a products database). For example, example product recognition disclosed herein can apply a CV-based classifier to the product facings to generate a subset of known products (e.g., product candidates, object candidates, etc.).

Each product candidate in the subset is associated with a unique product identifier (e.g., a UPC, an EAN, a SKU, a ID, etc.), which can be used to identify a respective product in the product database. In some examples, the predicted product candidates are assigned confidence scores (e.g., a level, a value) indicative of a likelihood or probability that the corresponding predictions are correct and/or accurate. In other words, the image-based confidences scores represent a probability distribution over a set of product candidates. These image-based confidence scores can be used to sort (e.g., rank) the product candidates to generate a first (e.g., image-based) set of product candidates. Generally, at least one goal of example product recognition disclosed herein is to generate, for an object depicted in a shelf image, a set of object candidates in which a first ranked object candidate is the object depicted in the product facing.

In some examples, the detected product facings (e.g., or any other type of object facings) and image-based confidence scores can be used to group the product facings by product. In particular, example product recognition disclosed herein can segment the shelf image by product by generating a product frame (e.g., a frame, a rectangle, a bounding box, a grid region, etc.) around one or more product facings recognized in the shelf image that correspond to a same product. For example, a grid of one or more product frames can be positioned (e.g., overlapped, overlaid, etc.) on the shelf image such that each grid region corresponds to a product frame of a single product. Each product frame is associated with respective set of product candidates corresponding to those product facings positioned therein.

To distinguish between product candidates in an image-based set of product candidates predicted for a product frame, example disclosed herein use textual cues in the shelf image. In particular, example product recognition disclosed herein identifies respective product identifiers for the product candidates in the image-based set of product candidates, and extracts (e.g., retrieves, receives, and/or otherwise obtains) corresponding product characteristics from the products database. In some examples, the product characteristics are used to generate a corpus of words (e.g., a bag of words, etc.), also herein referred to as reference text. In other words, the reference text is based on visual features used to predict the product candidates. Example product recognition disclosed herein can compare the reference text with product text extracted from shelf image to determine text similarity.

Examples disclosed herein generate the product text by applying an optical character recognition (OCR) algorithm to the shelf image to extract machine-readable text. In some examples, the OCR output includes one or more words detected in the shelf image. In other words, the OCR output corresponds to words depicted on a product's packaging. In some examples, each word output by the OCR process is represented by a text segment (e.g., a string of characters, transcribed characters, etc.), a text box (e.g., a bounding box) that defines a location (e.g., coordinates, etc.) of the text segment (e.g., relative to the shelf image), and an OCR confidence score.

In some examples, product recognition disclosed herein assigns the extracted words to respective ones of the product frames based on coordinates of the text boxes, coordinates of the product frames and/or the OCR confidence scores of the OCR output. Additionally or alternatively, the OCR algorithm can be applied to the one or more portions of the shelf image as opposed to the whole image. For example, the OCR algorithm can be applied to the shelf image at the product frame level. In some examples, product text assigned to a product frame is cleansed to generate a corpus of discriminative (e.g., meaningful) words that can be used to differentiate between products.

The grid facilitates improved recognition accuracy by enabling example product recognition disclosed herein to take advantage of similarities between the product text (e.g., extracted word(s)) and the reference text (e.g., reference word(s)). In particular, disclosed examples evaluate text similarity between the product text depicted in the product frame and reference text of each product candidate predicted for the product frame. The product text is compared with respective reference text of each product candidate to generate a respective text-based confidence score for each product candidate. The generating of the text-based confidence scores can be performed using, for example, a text similarity metric(s) (e.g., a Levenshtein distance and/or another string similarity metric) and/or a sorting algorithm based on weight (e.g., Term Frequency-Inverse Document Frequency (TF-IDF) and/or another numerical statistic). However, it is understood that examples disclosed are not limited thereto. Rather, different techniques can be used in additional or alternative examples, such that a degree of closeness of between pieces of text can be determined (e.g., Word2Vec, smooth inverse frequency, cosine similarity, etc.).

Example product recognition disclosed herein generates the text-based confidence scores for the product candidates, and generates a second (e.g., text-based) set of product candidates for the product frame. The text-based set of product candidates includes the same product candidates as a corresponding image-based set of product candidates. However, the product candidates in the text-based set of product candidates are ranked (e.g., ordered) based on their text-based confidence scores (e.g., as opposed to their image-based confidence scores). In other words, the text-based set of product candidate ranks the product candidates using natural language processing techniques while the image-based set of product candidates ranks the product candidates using the computer vision techniques disclosed above.

Example product recognition disclosed herein combines (e.g., fuses, merges, etc.) the image-based set of product candidates and the text-based set of product candidates to generate a third (e.g., final, output, merged, etc.) set of product candidates for the product depicted in the product frame. In other words, the final set of product candidates can be another (re)-ranked version of the image-based set of product candidates. In particular, examples disclosed herein generate a respective final (e.g., combined, merged, output) confidence score for each product candidate predicted for the product in the product frame. In some examples, a final confidence score for a given product candidate can be a maximum between (a) the product candidate's image-based confidence score and (b) a statistical value (e.g., a mean or other metric) between the image-based and text-based confidence scores for the product candidate. In such examples, the original predictions made by the example classifier are not downgraded, but rather guide the final predictions.

In some examples, a final confidence score for a product candidate corresponds to a statistical value between a given text-based confidence score and a respective image-based confidence score. In some examples, the final confidence scores are normalized across the product candidates predicted for the product in the product frame. While examples disclosed below utilize a harmonic mean as the statistical value, other means and/or metrics could be used additionally or alternatively (e.g., an arithmetic mean, a geometric mean, a contra-harmonic mean, etc.).

The final confidence scores are used to generate the final set of product candidates for the product depicted in the product frame, which is ranked using the final confidence scores. In other words, the final set of product candidates is based on merged image-based confidence score and text-based confidence scores. In some examples, a first-ranked product candidate in the final set of the product candidates is selected as a most likely product depicted in the product frame. In some examples, a first-ranked product candidate is associated with the product frame as the product depicted in the shelf image.

The first-ranked product candidate in the final set of the product candidates can be different than a first-ranked product candidate in the image-based set of product candidates. For example, the first-ranked product candidate in the final set of the product candidates may be a subsequently ranked product candidate in the image-based set of product candidates due to the limited discriminative power of CV-based techniques when recognition fine-grained differences between similar products.

Examples disclosed herein improve an accuracy and confidence of product recognition provided by an image-based method using text-based recognition techniques. The improvement(s) can be achieved due to improvements made in the differentiation of fine-grained products (e.g., products that are similar in appearance, challenging a discriminative power of the image-based classifier). The ability to capture and combine these text cues with the image-based recognition predictions improves the quality and automation of product recognition, helping to deliver a better product at a lower cost. Further, examples disclosed herein can significantly reduce or eliminate a need for auditors to spend numerous hours reviewing the results of the image recognition process, thus conserving processing resources, facilitating faster process execution and/or helping green energy conservation initiatives.

Disclosed examples can improve a computational efficiency of product recognition in images by significantly reduce a batch of images for manual review. In particular, example product recognition disclosed herein can achieve better recognition rates than known image recognition systems, especially in fine-grained product recognition. As a result, a workforce can spend less time reviewing the results of an image recognition process and, thus, the example systems and methods increase the efficiency of a shelf image audit process. Moreover, previous product recognition techniques required a workforce to spend numerous hours utilizing computing resources to review the results of the image recognition process, attempt to manually identify the product(s) shown in a shelf image, and/or correct errors. Labeling the products may involve computationally intensive searches searching through one or more databases containing thousands to millions of products to code a shelf image.

Disclosed examples enable machine processing and understanding of information conveyed in pictures using techniques in the AI fields of CV and NLP. Examples disclosed herein enable an entity to analyze more images in a shorter period of time, providing participants (e.g., market participants, pharmaceutical safety personnel, etc.) with timely actionable insights and enabling the entity to process a larger number of shelf images than would otherwise be feasible. In some examples, product recognition disclosed herein results in increased profits for market participants. For example, shelf auditing can be used to keep a close measure on shelf availability, which is critical in the retail industry. For example, out-of-stock shelf items means lost investment for retailers, lost sales opportunities at the shelf, and a potential loss in consumer faith and loyalty erosion. Disclosed examples enable fast and accuracy identify of shelves that are low and/or out of stock before they become lost sales.

Examples disclosed herein improve the technical fields of data collection and market research. While examples discussed below are described in relation to processing shelf images, examples disclosed herein are not limited thereto. Rather, disclosed examples can be applied to other image recognition use cases such as (but not limited to) text classification, information extraction and product matching, etc. For example, a merchant may offer an image recognition to consumers to facilitate comparison shopping. Further, example disclosed herein can be applied to use cases across different industries. Moreover, disclosed examples can be applied in different countries despite their language differences. In other words, disclosed examples can be extended to other tasks for which visual and textual landmarks can be combined.

FIG. 1 is a schematic illustration of an example environment 100 structured in accordance with teachings of this disclosure for identifying products in images of store shelves (e.g., shelf images, etc.). The environment 100 includes an example market research entity (MRE) 102, which is an entity that collects and/or analyzes market data to generate actionable insights. The MRE 102 can be, for example, an entity that detects and classifies products in images of store shelves to provide insights about assortment, product placement, prices, promotions, etc. In some examples, the MRE 102 is implemented by one or more servers, such as a physical processing center, an example cloud and/or Edge network (e.g., Amazon Web Services® (AWS), etc.), etc. In some examples, the MRE 102 includes a cloud-based architecture that integrates data assets and analytics into a platform. However, the MRE 102 can be another type of entity in other examples, such as a pharmaceutical entity, a veterinarian entity, a healthcare entity, etc.

The MRE 102 includes example product recognition circuitry 104, which is structured to perform product recognition (e.g., apply product recognition techniques disclosed herein) on the shelf images. The MRE 102 and the product recognition circuitry 104 of FIG. 1 are communicatively connected to an example network 106. The network 106 facilitates at least one communication path to any number of data sources, such as an example image database 108 and/or example audit device(s) 110 and/or corresponding data contained therein.

While the illustrated example of FIG. 1 includes the image database 108 as internal to the MRE 102, in additional or alternative examples such data sources may be external from the MRE 102. Further, while the illustrated example of FIG. 1 shows a single image database 108, examples disclosed herein are not limited thereto. For instance, any number and/or type of data storage may be implemented that is communicatively connected to the MRE 102, either directly and/or via the example network 106.

In the example of FIG. 1, the audit device(s) 110 captures images of shelves having one or more products (e.g., consumer packaged goods, items, objects, etc.), and transmits the images to the image database 108 and/or the MRE 102. In some examples, a shelf may be associated with a merchant (e.g., a retailer, a wholesaler, a pharmacy, a club store, etc.). In other examples, the shelf may be in another location, such as a merchant's home, in a vending machine, at a healthcare facility (e.g., hospitals, clinics, outpatient care centers, assisted living facilities, a warehouse, at a kiosk and/or any other establishment (e.g., a museum, a gallery, etc.) containing items on display and that can be audited. As used herein, a shelf image may contain only one shelf, a portion of a shelf, multiple shelves (e.g., in a column) and/or any other display orientation where a product is presented to a consumer.

The audit device(s) 110 can be, for example, a camera(s), a video recorder(s), a smartphone(s), a tablet(s), another type of electronic device having a camera(s), etc. In some examples, one or more audit devices 110 are associated with a workforce. For example, the MRE 102 can enlist auditors to capture shelf images and transmit the shelf images to the MRE 102 for product recognition. The auditors can include personnel and/or vehicles (e.g., technical devices such as a drone, a robot, etc.). In some examples, one or more of the audit devices 110 are associated with an employee(s) of a corresponding retailer. In some examples, one or more audit devices 110 are positioned at the shelves and configured to periodically and/or aperiodically capture images of the shelves.

In some examples, the MRE 102 recruits the audit device(s) 110 to collect thousands of images in different countries on a weekly basis, enabling the MRE 102 to deliver meaningful insights in a timely manner. However, the MRE 102 can obtain the shelf images at different time periods and/or from other resources (e.g., the internet, consumers, etc.). In this examples, the MRE 102 obtains the shelf images from the image database 108 and/or the audit device(s) 110 for product recognition by the product recognition circuitry 104.

The product recognition circuitry 104 applies one or more CV-based models to an obtained shelf image to detect a product facing(s) depicted in the image. In particular, the product recognition circuitry 104 determines boundaries of a region of interest (ROI) corresponding to the product facing(s) detected in the shelf image. In some examples, the shelf image includes more than one product, meaning that the product recognition circuitry 104 can recognize more than one product facing. In some such examples, the product recognition circuitry 104 crops the shelf image into multiple product facing, each of which corresponds to one product facing.

The product recognition circuitry 104 attempts to classify (e.g., recognize, identify, etc.) a product facing(s) in the shelf image by matching the product facing(s) with one or more reference products coded in a reference information system (e.g., a database, etc.). Generally, each product facing is associated with a respective product ID. For example, the product recognition circuitry 104 compares features in the product facing(s) with one or more learned features corresponding to the reference products to determine a subset of products coded in the reference information system. The product recognition circuitry 104 ranks the subset of products corresponding to the product facing(s) based on their confidence scores to generate set of product candidates.

Some traditional image recognition processes that are based purely on CV techniques fail to output a subset of products in which a first-ranked product candidate corresponds to a product depicted in the product facing(s) in approximately 30 percent of cases (e.g., an accuracy of approximately 70 percent). However, in approximately 92 percent of cases, a product ID corresponding to the product facing(s) is in the subset of products (e.g., at any rank). In other words, a product candidate corresponding to the product facing(s) is a runner-up (e.g., subsequent) product candidate in the set of product candidates in approximately 22 percent of analyzed product facings. At least one reason for the inaccuracy includes issues with fine-grained recognition, where two products are slightly different variants of each other. For example, a first product and a second product may have similar appearances (e.g., similar shape, color, label design, etc.), but a different characteristic (e.g., flavor, size, dosage, etc.).

Manufacturers typically design packaging for products to be distinct from competitor's packaging to foster brand awareness. However, a manufacturer may design the packaging for one of its products to be similar to other products that share a brand to promote a cross-product brand image. As a result, differentiating between similarly branded products of a manufacturer can be difficult. Additionally, merchants that use private label manufacturers may design packaging for premium products to be similar to leading brands in the same categories, whereas packaging for economy products may be designed to be distinct from national brands, but similar to other products in the merchant's economy product lines. Techniques based solely on computer vision struggle to identify these product line differentiators (e.g., flavor, scent, size, styles, sub-type, etc.) and/or other differentiators that can be used to differentiate between products (e.g., brands, special claims such as "gluten free," "high fiber," "all natural," etc.).

To address the foregoing issues, the product recognition circuitry 104 distinguishes between products in the set of product candidates using textual cues in the image together with its visual attributes. The product recognition circuitry 104 generates or otherwise obtains textual information (e.g., words and their corresponding bounding boxes) from the image using OCR techniques, which can be compared to characteristics of products in the set of product candidates. In particular, the product recognition circuitry 104 is communicatively coupled to an example products database 112, which is structured to store product reference data. The products database 112 of FIG. 1 includes a plurality of products with corresponding details including, but not limited to, product identifiers, product descriptions, characteristics and/or attributes used to arrange products, such as product classifications (e.g., category, brand, etc.) and/or physical attributes of the products (e.g., flavor, packaging type, etc.), etc.

While the illustrated example of FIG. 1 includes the example products database 112 residing in the example MRE 102, in some examples such data sources may be external to the MRE 102. Although FIG. 1 shows a single products database 112, any number and/or type of data storage may be implemented that is communicatively connected to the product recognition circuitry 104, either directly and/or via the network 106. Furthermore, the data stored in the products database 112 may be in any data format such as, for example, binary data, comma delimited data, tab delimited data, structured query language (SQL) structures, an executable (e.g., an executable binary, a configuration image, etc.), etc.

The product recognition circuitry 104 determines, for a given product frame, a respective text similarity score between (a) product text extracted from the product frame and (b) reference text extracted from the products database 112. The text similarity scores can be used to (re)-rank the set of product candidates based on the text cues extracted from the image. In other words, the product recognition circuitry 104 combines text extracted from the shelf image (e.g., textual features) with product reference data coded in the products databases (e.g., visual features) to improve the recognition process (e.g., reduce a need for manual review, reduce costs, etc.). An example implementation of the product recognition circuitry 104 is disclosed in further detail in relation to FIGS. 2 and 3.

In the illustrated example of FIG. 1, the product recognition circuitry 104 includes example report generator circuitry 114. In some examples, the report generator circuitry 114 of FIG. 1 generates a report based on predictions for a shelf image(s). In some examples, the report generator circuitry 114 and/or portions thereof may be used by a business, agency, organization, etc. to monitor effects of consumer buying behaviors on society and economies (e.g., continuously, during an event such as a pandemic, etc.), to monitor promotions and/or other events, etc. In some examples, the report generator circuitry 114 and/or portions thereof cause one or more actions on behalf of participants (e.g., market participants, pharmaceutical safety personnel, etc.). For example, the report generator circuitry 114 may cause an adjustment(s) to a supply chain(s) (e.g., automatically adjust a shipment order, generate a shipment order, cause a dispatch of product/object, cause a robotic object retrieval, etc.), a price/promotion campaign(s), etc.

In some examples, the report generator circuitry 114 is structured to cause a notification (e.g., a message, an alert, etc.) to be generated and transmitted in response to detecting an inventory event. For example, the report generator circuitry 114 may determine that a first type of medication is incorrectly positioned on a shelf (e.g., based on a product mapping stored in the product recognition circuitry 104, in the processor platform 1400 of FIG. 14, etc.). In response to such determination, the report generator circuitry 114 may generate and transmit a notification to an electronic device associated with corresponding personnel that includes an indication of the error. The MRE 102 of FIG. 1 includes example model trainer circuitry 116, which is structured to train one or more models. For example, the model trainer circuitry 116 can be used to train a detection model(s), a classification model(s), etc. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using training data. Because supervised training is used, the training data is labeled. Training is performed using hyperparameters that control how the learning is performed (e.g., a learning rate, a number of layers to be used in the machine learning model, etc.). In some examples re-training may be performed. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an evaluation metric(s) (e.g., an accuracy, precision, recall, et.) of the deployed model can be determined. If the feedback indicates that the metric(s) of the deployed model is less than a threshold or other criterion, training of an updated model can be triggered using the feedback and an updated training data set, hyperparameters, etc., to generate an updated, deployed model.

Figure 2:
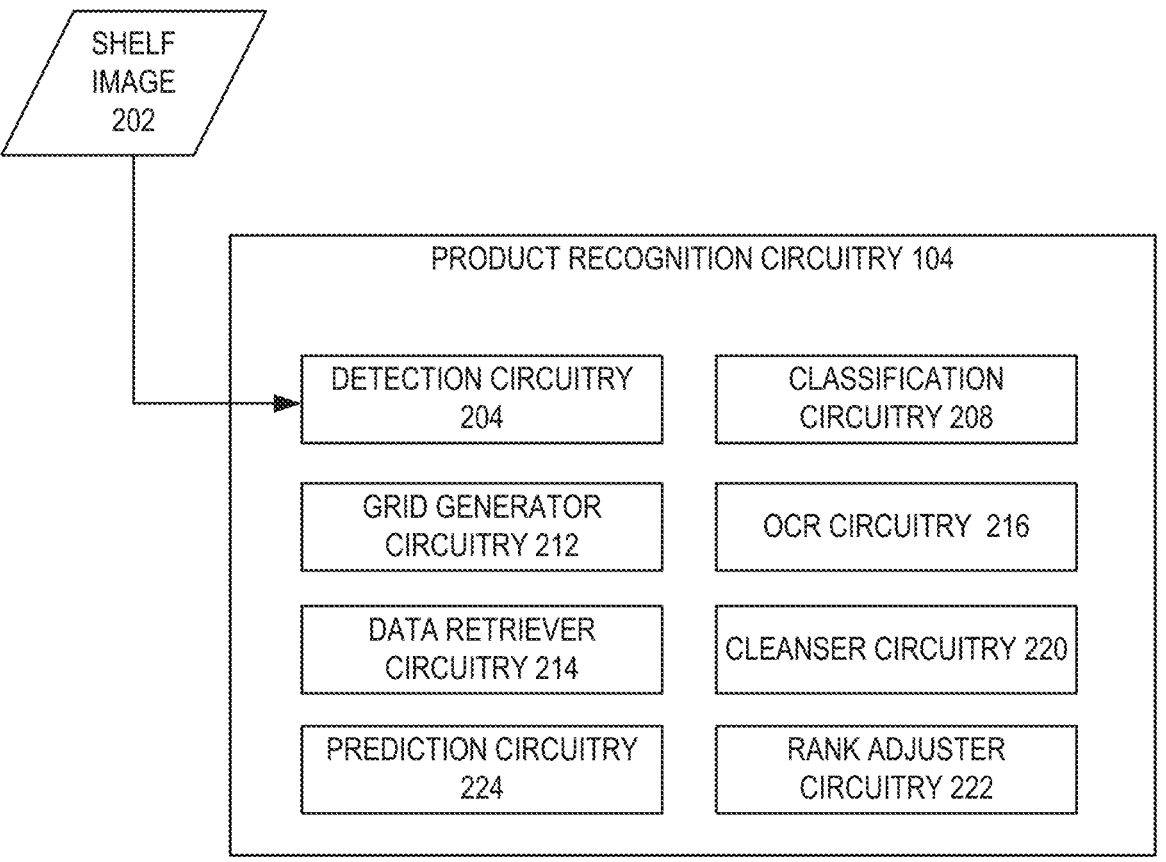
FIG. 2 is a block diagram of the example product recognition circuitry of FIG. 1.

FIG. 2 is a block diagram of an example implementation of the product recognition circuitry 104 of FIG. 1 to recognize products in shelf images. The product recognition circuitry 104 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the product recognition circuitry 104 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The product recognition circuitry 104 of FIG. 2 analyzes a shelf image to recognize and predict a product(s) (e.g., object(s)) depicted therein. In some examples, the shelf image includes more than one product facing, which can correspond to the same product and/or multiple different products. At least one goal of the product recognition circuitry 104 of FIG. 2 is to match each product appearing in the shelf image with a respective product ID stored in the products database 112. While examples disclosed below assume a shelf image includes more than one product, in some examples, a shelf image can include one product.

In operation, the product recognition circuitry 104 obtains an example shelf image 202 depicting product facings (e.g., regions of interest) corresponding to products positioned on a shelf. The product recognition circuitry 104 includes example detection circuitry 204 to detect and locate the product facings in the shelf image 202. In particular, the detection circuitry 204 of FIG. 2 implements and/or executes a trained object detection model structured to recognize generic (e.g., non-specific, basic, etc.) product facings. For example, the detection circuitry 204 applies object detection techniques (e.g., algorithms) to the shelf image 202 to determine boundaries of the product facings in the captured shelf image 202.

The detection circuitry 204 outputs one or more product facings represented by respective bounding boxes (e.g., rectangles, regions of interest, etc.) that define locations (e.g., coordinates, positions, boundaries, regions, etc.) of the product facings relative to the shelf image 202. In some examples, the detection circuitry 204 can crop the shelf image 202 into multiple facing images, each of which depict a respective product facing. In some examples, the detection circuitry 204 outputs a respective confidence score for each product facing.

The detection circuitry 204 of FIG. 2 employs a convolution neural network (CNN) trained to detect the generic product facings. A CNN is a DL network that relies on previously analyzed images (e.g., training image) to analyze new images. The CNN can detect, with a certain probability, product facings depicted in an image using pixel-by-pixel comparison techniques. Additionally or alternatively, the detection circuitry 204 can employ another neural network to detect the product facings such as, but not limited to, a region proposal network (RPN), a region-based convolution neural network (R-CNN), Mask R-CNN, a You Only Look Once (YOLO) algorithm(s), Single Shot Detection (SSD), etc. Additionally or alternatively, the detection circuitry 204 can detect the product facings on the shelf image 202 using other object detection techniques such as, but not limited to, a scale-invariant feature transform (SIFT), speeded-up robust features (SURF) detection, a histogram of gradients, etc. In some examples, the detection circuitry 204 is instantiated by programmable circuitry executing detection instructions and/or configured to perform operations such as those represented by the flowchart(s) of FIGS. 8-13.

The product recognition circuitry 104 includes example classification circuitry 208 to classify the product facings detected in the shelf image 202. The classification circuitry 208 implements and/or executes an image-based object classifier that receives the product facings detected by the detection circuitry 204 and predicts, for each product facing, one or more respective product candidates. In this example, the classification circuitry 208 implements a CNN-based classifier to predict the product candidates. Thus, the classification circuitry 208 is trained based on DL techniques to discern between products by relying on previously analyzed images.

In operation, the classification circuitry 208 identifies a product facing detected in the shelf image 202 and attempts to match the product facing to one or more products or objects coded and stored in a reference information system (e.g., the products database 112). For example, the classification circuitry 208 extracts features from the product facing by analyzing pixels and/or areas of pixels in the product facing. The classification circuitry 208 compares the extracted features to reference features learned during a training phase (e.g., based on reference images of consumer packaged goods). The classification circuitry 208 compares the reference features to the extracted features of the product facing and based on the comparisons, selects one or more products (e.g., product IDs) to be product candidates. For example, the selection can be based on confidence scores indicative of a likelihood (e.g., a confidence) that a given product candidate is the product depicted in the product facing. In some examples, a selection of possible reference features is limited to only certain features that meet one or more selection criteria (e.g., a category of consumer packaged goods, products sold at a particular merchant, etc.). For example, if a captured image is known to be taken from the drink section of a supermarket, the selection criterion may filter possible candidate reference images to include only those in drink-related categories (e.g., soda, sports drinks, water, juice, etc.).

The classification circuitry 208 of FIG. 2 outputs the product candidates and corresponding confidence scores (e.g., image-based confidence scores) for the product facing. In some examples, the classification circuitry 208 can output a predetermined number of the product candidates. For example, the classification circuitry 208 can output an amount (e.g., 2, 5, 10, etc.) of the product candidates having the highest confidence scores. The classification circuitry 208 of FIG. 2 sorts (e.g., ranks, organizes, etc.) the product candidates based on the image-based confidence scores to generate an example first (e.g., image based) set of product candidates, where the image-based set of product candidates is a ranked list (e.g., tuple, etc.).

When the shelf image 202 includes multiple product facings, the classification circuitry 208 iterates through the product facings detected in the shelf image 202 to generate a respective image-based set of product candidates for corresponding product facings detected therein. In some examples, the classification circuitry 208 outputs the shelf image 202 on which the detected product facings (e.g., the facing bounding boxes) are annotated or otherwise associated with their respective product candidates.

While the classification circuitry of FIG. 2 is described as applying or implementing a CNN classifier, other AI-based techniques can be used in additional or alternative examples. For example, the classification circuitry 208 can employ a Residual Neural Network (ResNet) algorithm(s), a Mobile Neural Network (MobileNet) algorithm, a Transformer-based model, etc. In some examples, the classification circuitry 208 is instantiated by programmable circuitry executing classification instructions and/or configured to perform operations such as those represented by the flowchart(s) of FIGS. 8-9.

In some examples, the detection circuitry 204 and the classification circuitry 208 implement a multi-stage AI model for detection and classification. For example, the detection circuitry 204 and the classification circuitry 208 can implement an example faster R-CNN in which the classification circuitry 208 implements a region proposal network and the classification circuitry 208 implements a classifier. However, other detection and classification techniques can be used to detect and classify product facings as will be understood by persons of ordinary skill in the art.

The detection and classification of the product facings in the shelf image 202 are determined using CV techniques based on visual features in the shelf image 202. As discussed above, techniques based purely on CV struggle to accurately differentiate between products having similar appearance (e.g., products that are different variants of the same product line and, therefore, have different product IDs), reducing an accuracy of the image-based set of product candidates. For example, CV-based models often struggle to identify product differentiators (e.g., flavor, scent, size, styles, sub-type, dosage, etc.) when performing fine-grained classification. As discussed in further detail below, the product recognition circuitry 104 utilizes text extracted from the shelf image 202 to determine whether to re-arrange the first set of product candidates to improve the recognition process, increase an accuracy of the predictions, and reduce computational resource consumption by reducing a need for manual review the predictions.

The product recognition circuitry 104 includes example grid generator circuitry 212, which is structured to divide data output by the classification circuitry 208 into groups based on similarity. In particular, the grid generator circuitry 212 clusters (e.g., groups) the product facings by product. In some examples, the grid generator circuitry 212 is instantiated by programmable circuitry executing cluster instructions and/or configured to perform operations such as those represented by the flowchart(s) of FIG. 8.

Clustering is a process of dividing a dataset(s) into groups based on patterns identified in a dataset(s). Generally, a clustering technique uses an iterative approach to group items in a dataset into clusters that possess similar characteristics. The grid generator circuitry 212 of FIG. 2 can use a clustering technique to identify product facings having substantially similar sets of product candidates and positions on the shelf. In some examples, a first set of product candidates is substantially similar to a second set of product candidates when the first and second sets of product candidates include the same product identifiers. In some examples, the first set of product candidates is substantially similar to the second set of product candidates when the first and second sets of product candidates include the same product identifiers in the same order. In some such examples, the product candidates include substantially similar confidence scores (e.g., within ten percent, etc.).

In particular, the grid generator circuitry 212 of FIG. 2 executes a cluster algorithm(s) (e.g., a pattern recognition algorithm(s), etc.) to group the product facings based on (1) locations of the product facings (e.g., relative to one another and/or the shelf image 202), and (2) image-based sets of product candidates and their corresponding image-based confidence scores. For example, the cluster algorithm applied by the grid generator circuitry 212 can be, but is not limited to, a density-based clustering algorithm (e.g., density-based spatial clustering of applications with noise (DB-SCAN), etc.), a centroid-based algorithm (e.g., k-means, etc.), connectivity-based algorithm, etc.

In some examples, the grid generator circuitry 212 compares pixel coordinates of a first product facing with pixel coordinates of a second product facing to determine whether a distance between the first and second product facings satisfies a threshold distance. For example, if the second product facings is approximately 200 pixels adjacent (e.g., below, above, lateral, etc.) to the first product facing, the first and second product facings may belong to a same grid. In some examples, the threshold distance is a smart threshold distance such that the grid generator circuitry 212 can determine distances between shelves and products. For example, the grid generator circuitry 212 can position a seed (e.g., a seed point, a centroid, etc.) and allow the seed to grow to determine a region of products that are close to the seed (e.g., using pixel-based distances). For example, the grid generator circuitry 212 of FIG. 2 selects a first product facing (e.g., randomly), and executes a routine to find adjacent product facings. In some examples, this routine includes scanning ones of the product facings surrounding the selected product facing to identify one or more product facings within a threshold distance relative to the first product facing. In some examples, the threshold distance is based on centroid distances, but other threshold distances can be used in other examples.

When the grid generator circuitry 212 of FIG. 2 identifies a second product facing(s) that satisfies the threshold distance, the grid generator circuitry 212 determines whether the second product facing(s) satisfies a candidate similarity threshold (e.g., a same product being predicted). That is, the grid generator circuitry 212 of FIG. 2 clusters the product facings based on their locations, as well as on their product candidates (e.g., using distances in a confidence space). For example, the first product facing may include a first ranked product candidate (e.g., Product A) having confidence score of 0.9 while the second product facing(s) may include a first ranked product candidate (e.g., Product A) having confidence score of 0.95. In some examples, the candidate similarity threshold is based on a difference, an average, etc.

When the second product facing(s) satisfies the threshold distance and the candidate similarity threshold, the grid generator circuitry 212 aggregates the second product facing (s) and the first product facing to the same product frame. In other words, the grid generator circuitry 212 applies a cluster technique that considers distances between the product facings, their product candidates, and confidences of the product candidates. In this example, the clustering is an iterative process. When the grid generator circuitry 212 aggregates the one or more product facings with the first product facing, the grid generator circuitry 212 generates a new threshold distance based on new centroid of the aggregated product facings. When the centroid changes, the grid generator circuitry 212 attempts to identify adjacent product facings that are within a new threshold distance relative to the new centroid. If the grid generator circuitry 212 fails to identify another product facing that can be aggregated to a given product frame, the grid generator circuitry 212 selects another product facing (e.g., randomly) that has not been aggregated to a grid and repeats the process. In some examples, the grid generator circuitry 212 iterates through this process until each product facing in the shelf image 200 has been assigned to a product frame.

Based on the clusters, the grid generator circuitry 212 encloses one or more product facings assigned to a group to generate a corresponding product frame. In particular, the grid generator circuitry 212 generates a product frame around one or more product facings detected and recognized in the shelf image 202 and depicting the same product. In other words, a product frame corresponds to one or more product facings of a respective product depicted therein. The grid generator circuitry 212 of FIG. 2 positions the product frames over the shelf image 202 such that a grid is overlaid on top of the shelf image 202. The grid generator circuitry 212 determines grid boundaries based on the product frames. In other words, the product frames indicate locations (e.g., positions, boundaries, regions, etc.) of objects (e.g., the products) in the shelf image 202. When a group contains a single product facing, its product frame can be kept intact. Each product frame is defined by (a) a bounding box enclosing product facings in the respective group, (b) a subset of product candidates, and (c) a layout (e.g., a number of rows and/or columns of the grid). In some examples, each product facing in a given product frame includes the same subset of product candidates. In some examples, two or more product frames can include the same product candidates.

The product recognition circuitry 104 includes example data retriever circuitry 214 to extract product data for each product frame detected in the shelf image 202. In particular, the data retriever circuitry 214 can utilize product IDs of the predicted product candidates to retrieve corresponding product descriptions (e.g., one or more product characteristics) from the products database 112 (FIG. 1) and/or another database(s). The product descriptions extracted from the products database 112 represent reference data of the predicted candidates, which can be compared to text extracted from the shelf image 202.

In operation, the data retriever circuitry 214 identifies product candidates (e.g., product IDs) predicted for a given product frame(s) (e.g., by the classification circuitry 208), which correspond to a product depicted therein. In some examples, the data retriever circuitry 214 retrieves one or more product characteristics (e.g., attributes, facts, etc.) for each product candidate and builds respective product descriptions. For example, the data retriever circuitry 214 can concatenate product characteristics for a given product ID to generate a corresponding product description for the product ID. Additionally or alternatively, the data retriever circuitry 214 can obtain a product description(s) for the product ID as stored in the products database 112. For example, the products database 112 can include one or more fields for product descriptions (e.g., description, short description, local description, user description, etc.). In some such examples, the data retriever circuitry 214 obtains one or more product descriptions for the product ID and combines the results. In some examples, the data retriever circuitry 214 is instantiated by programmable circuitry executing data retriever instructions and/or configured to perform operations such as those represented by the flowchart(s) of FIGS. 8 and 11.

The product recognition circuitry 104 includes example OCR circuitry 216, which is structured to extract machine-readable text (e.g., words) from the shelf image 202. The product recognition circuitry 104 applies an optical character recognition (OCR) recognition algorithm to the shelf image 202 and/or portions thereof (e.g., the product facings, the product frames, etc.). For example, the OCR circuitry 216 can examine the shelf image 202 pixel by pixel, looking for shapes that match character traits. In some examples, the OCR circuitry 216 is implemented by a third party OCR engine (e.g., a third party web based OCR tool, etc.). In such examples, the OCR circuitry 216 is an application programming interface (API) that interfaces with the third party tool. In some such examples, the output of the OCR circuitry 216 can be cached to save costs. In some examples, the OCR circuitry 216 is instantiated by programmable circuitry executing OCR instructions and/or configured to perform operations such as those represented by the flowchart(s) of FIGS. 8 and 10.

The OCR circuitry 216 of FIG. 2 detects text, generates text boxes, determine locations (e.g., coordinates) of the text boxes, and transcribes the text in a manner that a computer can understand. In examples disclosed herein, the text is output at the word level. As disclosed herein, a word (e.g., a text string, a segment, a text segment, etc.) refers to one or more characters. For example, a word can be (but is not limited to) a word, a partial word, an abbreviation, a name, a number, a symbol, etc. For example, a word can correspond to a price, a product type, a brand, a material, a standard, a size, a flavor, and/or any word, number, and/or symbol on a product package. In other words, the OCR circuitry 216 extracts words on packaging of products depicted in the shelf image 202.

In some examples, each word output by the OCR circuitry 216 is represented by or includes a string of characters and a respective text box that defines characteristics (e.g., a group of coordinates, etc.) of a bounding box enclosing a corresponding word relative to the shelf image 202. In some examples, the OCR circuitry 216 outputs respective confidence scores for corresponding text boxes. A confidence score is indicative that a word was correctly transcribed by the OCR circuitry 216. That is, a higher confidence score indicates a higher likelihood that a word is correct or accurate.

While OCR engines are generally capable of recognizing, detecting, and transcribing text, the OCR output does not guarantee a strict top-to-bottom, left-to-right ordering in the list of obtained words. The OCR circuitry 216 can struggle to properly align and arrange detected words in unstructured images. Further, the OCR circuitry 216 can struggle to properly transcribe text when the shelf image 202 and/or a portion thereof is of low quality and/or low resolution. Even though the shelf image 202 may be overall sharp, the shelf image 202 can include regions in which text is blurry or otherwise difficult to detect. The grid generated by the grid generator circuitry 212 can improve recognition accuracy by taking advantage of other product facings in a product frame, which can include regions that are sharper than corresponding blurry regions in which the text cannot be detected. Moreover, the grid enables comparison between the product text extracted from the image and the reference text extracted from the product database 112.

The grid generator circuitry 212 is structured to group the OCR detected words by product frame. In particular, the grid generator circuitry 212 of FIG. 2 iteratively assigns words output by the OCR circuitry 216 to a product frame based on coordinates of the text boxes and boundaries of the grid of product frames such that a word is assigned to a single grid. In some examples, the grid generator circuitry 212 assigns the words to the grids based on intersection over union (IoU) algorithms that compare text box to grid boundaries. For example, a first text box can be assigned to a first grid boundary when a IoU of the first text box relative to the first grid boundary satisfies a IoU threshold. In some examples, the grid generator circuitry 212 sorts the words such that a word is associated with a grid that contains a centroid of the word's text box. Thus, words grouped within a product frame correspond to a same product.

The product recognition circuitry 104 includes example cleanser circuitry 220 to identify meaningful (e.g., discriminative) words extracted from the shelf image 202. For example, the meaningful words can correspond to product line differentiators such as (but not limited to) flavor, scent, size, brand, special claims, etc. In particular, the cleanser circuitry 220 applies one or more heuristics for text normalization and sanitization to OCR extracted words assigned to a given product frame to generate a respective first bag-of-words (BOW) for the product frame. A BOW is a technique to extract features from text in a way that a computer can understand. As used herein, a BOW refers to text represented as a bag (e.g., multiset) that describes occurrences (e.g., a multiplicity, a frequency, etc.) of words, disregarding grammar and word order. By generating a first BOW for a product frame based on OCR output, the cleanser circuitry 220 attempts to identify and keep discriminative words that will appear only in a product description that actually corresponds to a product depicted in the product frame, and which will not appear in product descriptions of other product candidates that are not depicted in the product frame.

To generate a first BOW (e.g., a text-based BOW, a detected BOW, a product BOW, etc.) for a given product frame, the cleanser circuitry 220 of FIG. 2 removes OCR detected words with a relatively low confidence score. For example, the cleanser circuitry 220 can remove OCR detected words having an OCR confidence score that satisfies a OCR confidence threshold (e.g., 0.5). In some examples, the cleanser circuitry 220 removes relatively short OCR detected words (e.g., words that satisfy a character count threshold). For example, the cleanser circuitry 220 can remove OCR detected words having less than four characters. In some examples, the cleanser circuitry 220 removes specific characters from OCR detected words, such as (but not limited to) non-Unicode characters and/or punctuation signs. In some examples, the cleanser circuitry 220 removes duplicative OCR detected words (e.g., OCR detected words that appear in each bag linked to a product frame). This is because such duplicative OCR detected words typically come from multiple facings with the same orientation on the same grid.

Based on at least the foregoing, the cleanser circuitry 220 attempts to keep the discriminative words that can be used to distinguish between the product candidates predicted for the product frame. The cleanser circuitry 220 determines a outputs the text-based BOW having discriminative words for the product frame. When the shelf image 202 includes multiple product frames, the cleanser circuitry 220 iterates through the product frames to generate a respective text-based BOW for corresponding ones of the product frames.

By extracting text from the image and assigning the text to a corresponding product frame, the product recognition circuitry 104 can combine (e.g., integrate, merge, etc.) these text-based text cues with image-based text cues corresponding to the product descriptions (e.g., characteristics) extracted from the products database 112 (e.g., based on the output of the classification circuitry 208). The ability to capture and combine these text cues improves the quality and automation of the product recognition circuitry 104 relative to traditional approaches, resulting in better intelligence at a lower cost. To help facilitate the comparison, the cleanser circuitry 220 of FIG. 2 also generates a respective second bag-of-words (BOW) (e.g., a reference BOW, a description BOW, an image-based BOW, etc.) for corresponding product candidates of a given product frame. In some examples, the cleanser circuitry 220 removes words in from each product description that satisfy the character count threshold. In some examples, the cleanser circuitry 220 removes specific characters from remaining reference words in the product description (e.g., non-Unicode characters, punctuation signs, etc.).

The cleanser circuitry 220 determines a respective occurrence for each remaining word in given product description and outputs a reference BOW. In other words, each reference BOW corresponds to a respective product candidate, which itself corresponds to a particular product frame. The cleanser circuitry 220 iterates through the product candidates in the product frame, and through the product frames in the grid of product frames overlaid on the shelf image 202. In some examples, the cleanser circuitry 220 is instantiated by programmable circuitry executing cleanser instructions and/or configured to perform operations such as those represented by the flowchart(s) of FIGS. 8, 10, and 11.

The product recognition circuitry 104 includes example rank adjuster circuitry 222, which is structured to compare a text-based BOW of a given product frame to each corresponding reference BOW associated with the product frame. For example, the rank adjuster circuitry 222 determines a respective text-based confidence score for each reference BOW associated with the product frame. As such, the rank adjuster circuitry 222 determines text-based confidence scores for product candidates assigned to the given product frame. As used herein, a text-based confidence score represents a similarity score (e.g., level, value, etc.) between the text-based BOW and a given reference BOW. In this example, the text-based confidence scores are based at least on string distance scores and a sorting algorithm(s).

In operation, the rank adjuster circuitry 222 of FIG. 2 identifies a text-based BOW having discriminative words extracted from a given product frame. The rank adjuster circuitry 222 attempts to identify reference words in a first reference BOW that match ones of the discriminative words in the text-based BOW. The rank adjuster circuitry 222 identifies a matched reference word when a string distance (e.g., a string distance score, an edit distance, etc.) for a pair of words being compared satisfies (e.g., exceeds) a string distance threshold. In particular, the rank adjuster circuitry 222 of FIG. 2 iteratively compares ones of the reference words against ones of the discriminative words to determine a respective string distance for each pair of words being compared. As used herein, a string distance is a measure of distance between two text strings for approximate string matching. The string distance (e.g., an inverse similarity) can be used to determine which reference words are important by identifying reference words that match the discriminative words.

In this example, the rank adjuster circuitry 222 uses a Levenshtein distance, which is an edit distance that quantifies dissimilarity between two text strings relative to one another. The Levenshtein distance corresponds to a number of edits needed to transform a first word into a second word. The transformation can include, for example, insertion, deletion and/or substitution of one or more character(s), etc. It is understood, however, that examples disclosed herein are not limited thereto. For example, the rank adjuster circuitry 222 can apply other string similarity metrics, such as (but not limited to) a Hamming distance, a Jaccard similarity, Damerau-Levenshtein, bag distance, Jaro-Winkler distance, etc.

The rank adjuster circuitry 222 of FIG. 2 evaluates the reference words in the first reference BOW against the words in the text-based BOW to identify ones of the reference words associated with a Levenshtein distance less than or equal to the string distance threshold (e.g., two). When the string distance threshold is two, for example, the rank adjuster circuitry 222 discards ones of the reference words that are associated with a Levenshtein distance greater than two. In other examples, the string distance threshold can be higher or lower. The rank adjuster circuitry 222 iteratively evaluates reference words in other reference BOWs against the words in the text-based BOW to identify additional matched words for other product candidates.

The rank adjuster circuitry 222 determines a respective text similarity score for each reference BOW based on respective string distances of its matched reference words. For example, upon identifying one or more matched words in the reference BOWs of the given product frame, the rank adjuster circuitry 222 applies a respective first (e.g., frequency) weight to each matched reference word. In this example, the rank adjuster circuitry 222 determines a first weight for a given matched reference word based on a respective term frequency-inverse document frequency (TF-IDF) score (e.g., value, weight, etc.), which is a statistical value indicative of how "important" a word is to a collection or corpus. The TD-IDF is useful for reducing a weight of a word that is common within the reference BOWs for the product frame. In other words, the TF-IDF is used to adjust for the fact that some words appear more frequently in general, but may not be relevant or meaningful. For example, a brand name appearing a product is likely to appear in each product description, thus lowering its relevance relative to other words. On the other hand, a particular flavor may appear in one product description, giving it more weight relative to other words.

The rank adjuster circuitry 222 determines a TF-IDF value for a given matched reference word based on a term frequency (TF) value of the matched reference word and an inverse document frequency (IDF) value of the matched reference word. The TF value for the matched reference word is determined relative to all words in a corresponding reference BOW. The TF value increases proportionally with a number of times the matched reference word appears in the reference BOW relative to a number of words in the reference BOW. The more often the matched reference word appears, the higher the TF value becomes. However, the TF value is offset by an IDF value for the given matched reference word, which is determined relative to all reference BOWs associated with the product frame. The IDF value is determined based on a number of reference BOWs associated with the product frame that contain the matched reference word relative to a total number of reference BOWs associated the product frame (e.g., a number of product candidates).

In operation, the rank adjust circuitry of FIG. 2 can determine a TF value for a first matched reference word in a first reference BOW by comparing an occurrence of the first matched reference word with a total number of words in the first reference BOW. Further, the rank adjust circuitry of FIG. 2 can determine an IDF value for the first matched reference word by dividing a total number of reference BOWs (e.g., product candidates) associated with a corresponding product frame by a number of those reference BOWs that have the first matched reference word. The rank adjuster circuitry 222 can determine a TF-IDF for the first matched word by multiplying its TF by its IDF. The rank adjuster circuitry 222 of FIG. 2 iterates through each matched reference word for a product frame to determine respective TF-IDF values for the matched reference words.

Further, the rank adjuster circuitry 222 generates weighted string distances for reference words remaining for the shelf image 202. In particular, the rank adjuster circuitry 222 applies a respective first weight to each matched reference word by combining (e.g., multiplying, etc.) a given TF-IDF value and a respective Levenshtein distance. In some examples, the rank adjuster circuitry 222 iterates through the grid of the shelf image 202 to combine respective first weights and corresponding Levenshtein distances of the matched reference words. In some examples, the rank adjuster circuitry 222 filters out (e.g., removes) matched reference words having a weighted string distance that satisfies a string similarity threshold. For example, the string similarity threshold can be determined using a validation set. In particular, a validation set can include ground truth string matches and mismatches. The validation set can be used to empirically determine a string similarity threshold at which to drop words (e.g., identify mismatches). In some examples, the string similarity threshold can be adjusted (e.g., periodically and/or aperiodically) if a current approach is determined to be sub-optimal.

The rank adjuster circuitry 222 of FIG. 2 iterates through each matched reference word for a given reference BOW and remove ones of the matched reference words having a weighted string distance that satisfies a string similarity threshold. Further, the rank adjuster circuitry 222 determines a text similarity score for the reference BOW based on a weighted sum of the remaining matched reference words. In this example, the rank adjuster circuitry 222 utilizes a weight sum of the remaining weighted string distances such that each remaining matched reference word is weighted by an inverse of its respective Levenshtein distance to emphasize matches with lower distances. In other words, the rank adjuster circuitry 222 can apply a second (e.g., distance) weight to each remaining reference word that is based on its respective string distance. In some examples, the text similarity scores can be determined a manner consistent with example Equation (1), where $\mathcal{W}$ refers to the text-based BOW, $\mathcal{T}$ refers to a respective image-based BOW, leven (w, t) refers to a Levenshtein distance between words w and t, and $f_n$ (w) refers to a frequency of a matched reference word, w, in the image-based BOWs for the product frame.

$$s_t = \sum_{w \in \mathcal{W}} \sum_{t \in \mathcal{T}} \frac{1}{(1 + leven(w, t))f_n(w)} \qquad \text{Equation (1)}$$

The text similarity score represents a level of similarity of a reference BOW to a corresponding text-based BOW. In other words, the text similarity score represents a similarity value of a product description of a product candidate relative to words extracted from a product desiccated in a corresponding product facing.

The rank adjuster circuitry 222 iterates through the product candidates of the given product frame to determine a respective text similarity score for each reference BOWs corresponding thereto. Further, the rank adjuster circuitry 222 of FIG. 2 normalizes the text similarity scores for the given product frame to generate text-based confidence scores for its product candidates. In this example, the rank adjuster circuitry 222 normalizes the text similarity scores relative to the reference BOWs of the product frame. In particular, the rank adjuster circuitry 222 generates the text-based confidence scores by dividing each text similarity score by a maximum text similarity score associated with the product frame. However, the rank adjuster circuitry 222 can normalize the text similarity scores using an additional or alternative technique in other examples as will be understood by one of ordinary skill in the art.

Further, the rank adjuster circuitry 222 generates a respective second (e.g., text-based) set of product candidates for each product frame in the shelf image 202. In particular, the rank adjuster circuitry 222 utilizes the text-based confidence scores to sort the product candidates. The rank adjuster circuitry 222 outputs a text-based set of product candidates based on the sorted product candidates. In some examples, the rank adjuster circuitry 222 iterates through the shelf image 202 to generate a respective set-based set of product candidates for each product frame detected therein. In some examples, the rank adjuster circuitry 222 is instantiated by programmable circuitry executing rank adjuster instructions and/or configured to perform operations such as those represented by the flowchart(s) of FIGS. 8 and 12.

The product recognition circuitry 104 includes example prediction circuitry 224, which is structured to select a product candidate for a given product frame as a most-likely product candidate based final confidence scores for the product candidates. In particular, the product recognition circuitry 104 merges (e.g., combine, fuse, etc.) text-based confidence scores corresponding to the product frame with respective image-based confidence scores to generate merged scores. While the prediction circuitry 224 of FIG. 2 utilizes a harmonic mean to combine the text-based and image-based confidences scores, other types of means or metrics to determine an average of two rates can be used to combine the confidence scores in additional or alternative examples as will be readily understood by one of ordinary skill in the art. As used herein, a harmonic mean refers to a reciprocal of an average (e.g., arithmetic mean) of reciprocals of a given set of observations. The prediction circuitry 224 determines a respective merged score for each product candidate for the product frame by determining a harmonic mean between respective image-based and text-based confidence scores. Thus, the prediction circuitry 224 combines two corresponding probability distributions to generate a respective merged score.

In this example, a final confidence score for a given product candidate is a maximum between a respective merged score and a respective image-based confidence score. Further, the prediction circuitry 224 determines a final confidence score for each product candidate of the product frame. As such, original predictions made by the object classifier (e.g., the classification circuitry 208) are not downgraded, but rather work to guide the final predictions. For example, the prediction circuitry 224 of FIG. 2 determines a final confidence score, $s_f$, for each product candidate in a manner consistent with example Equation (2), where sc refers to an image-based confidence score and $s_t$ refers to a text-based confidence score.

$$s_f = \max\left(s_c, 2 * \frac{s_c s_t}{s_c + s_t}\right) \qquad \text{Equation (2)}$$

The final confidence scores of the product candidates are used to sort the product candidates and generate a final set of product candidates. In some examples, a first ranked product in the final set of product candidates is a most likely product candidate of a product depicted in the product frame. In some examples, the prediction circuitry 224 associates the product frame with the first ranked product candidate in the final set of product candidates. In some examples, the prediction circuitry 224 is instantiated by programmable circuitry executing prediction instructions and/or configured to perform operations such as those represented by the flowchart(s) of FIGS. 8 and 13.

Based on the foregoing, the product recognition circuitry 104 determines or predicts product candidates for a product depicted in a product frame, each of which includes an image-based confidence score. Further, the product recognition circuitry 104 improves these predictions by determines a final confidence score that integrates text similarity between OCR extracted words from a given product package and product descriptions of predicted product candidates. However, the final confidence scores are determined such that the original image-based confidence scores remain unharmed. This improves an image recognition process to provide increased accuracy to reduces errors and save energy by avoiding a need for manual review, which requires consumption of computational resources (e.g., GPU resources). An example implementation of the product recognition circuitry 104 is discussed in further detail below in relation to FIG. 3.

In some examples, the product recognition circuitry 104 includes means for recognizing an object in an image. For example, the means for recognizing an object in an image may be implemented by the detection circuitry 204 and/or the classification circuitry 208. In some examples, the detection circuitry 204 and/or the classification circuitry 208 may be instantiated by programmable circuitry such as the example programmable circuitry 1412 of FIG. 14. For instance, the detection circuitry 204 and/or the classification circuitry 208 may be instantiated by the example microprocessor 1500 of FIG. 15 executing machine executable instructions such as those implemented by at least blocks 802, 804 of FIGS. 8-9. In some examples, the detection circuitry 204 and/or the classification circuitry 208 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the detection circuitry 204 and/or the classification circuitry 208 may be instantiated by any other combination of hardware, software, and/or firmware. For example, the detection circuitry 204 and/or the classification circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the product recognition circuitry 104 includes means for generating a grid of product frames. For example, the means for generating a grid of product frames may be implemented by the grid generator circuitry 212. In some examples, the grid generator circuitry 212 may be instantiated by programmable circuitry such as the example programmable circuitry 1412 of FIG. 14. For instance, the grid generator circuitry 212 may be instantiated by the example microprocessor 1500 of FIG. 15 executing machine executable instructions such as those implemented by at least blocks 806, 808 of FIG. 8. In some examples, grid generator circuitry 212 may be instantiated by hardware logic circuitry, which may be implemented by an ASIC. XPU, or the FPGA circuitry 1600 of FIG. 16 configured and/or structured to perform operations corresponding to the machine readable instructions. Additionally or alternatively, the grid generator circuitry 212 may be instantiated by any other combination of hardware, software, and/or firmware. For example, the grid generator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the product recognition circuitry 104 includes means for generating a multiset of words. For example, the means for generating a generating a multiset of words may be implemented by the cleanser circuitry 220. In some examples, the cleanser circuitry 220 may be instantiated by programmable circuitry such as the example programmable circuitry 1412 of FIG. 14. For instance, the cleanser circuitry 220 may be instantiated by the example microprocessor 1500 of FIG. 15 executing machine executable instructions such as those implemented by at least blocks 812, 814 of FIGS. 8, 10, and/or 11. In some examples, cleanser circuitry 220 may be instantiated by hardware logic circuitry, which may be implemented by an ASIC. XPU, or the FPGA circuitry 1600 of FIG. 16 configured and/or structured to perform operations corresponding to the machine readable instructions. Additionally or alternatively, the cleanser circuitry 220 may be instantiated by any other combination of hardware, software, and/or firmware. For example, the cleanser circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the product recognition circuitry 104 includes means for determining text similarity. For example, the means for determining text similarity may be implemented by the rank adjuster circuitry 222. In some examples, the rank adjuster circuitry 222 may be instantiated by programmable circuitry such as the example programmable circuitry 1412 of FIG. 14. For instance, the rank adjuster circuitry 222 may be instantiated by the example microprocessor 1500 of FIG. 15 executing machine executable instructions such as those implemented by at least blocks 816 of FIGS. 8 and/or 12. In some examples, rank adjuster circuitry 222 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the rank adjuster circuitry 222 may be instantiated by any other combination of hardware, software, and/or firmware. For example, the rank adjuster circuitry 222 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the product recognition circuitry 104 includes means for predicting. For example, the means for merging predicting may be implemented by the prediction circuitry 224. In some examples, the prediction circuitry 224 may be instantiated by programmable circuitry such as the example programmable circuitry 1412 of FIG. 14. For instance, the prediction circuitry 224 may be instantiated by the example microprocessor 1500 of FIG. 15 executing machine executable instructions such as those implemented by at least blocks 818 of FIGS. 8 and/or 13. In some examples, prediction circuitry 224 may be instantiated by hardware logic circuitry, which may be implemented by an ASIC, XPU, or the FPGA circuitry 1600 of FIG. 16 configured and/or structured to perform operations corresponding to the machine readable instructions. Additionally or alternatively, the prediction circuitry 224 may be instantiated by any other combination of hardware, software, and/or firmware. For example, the prediction circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 3:
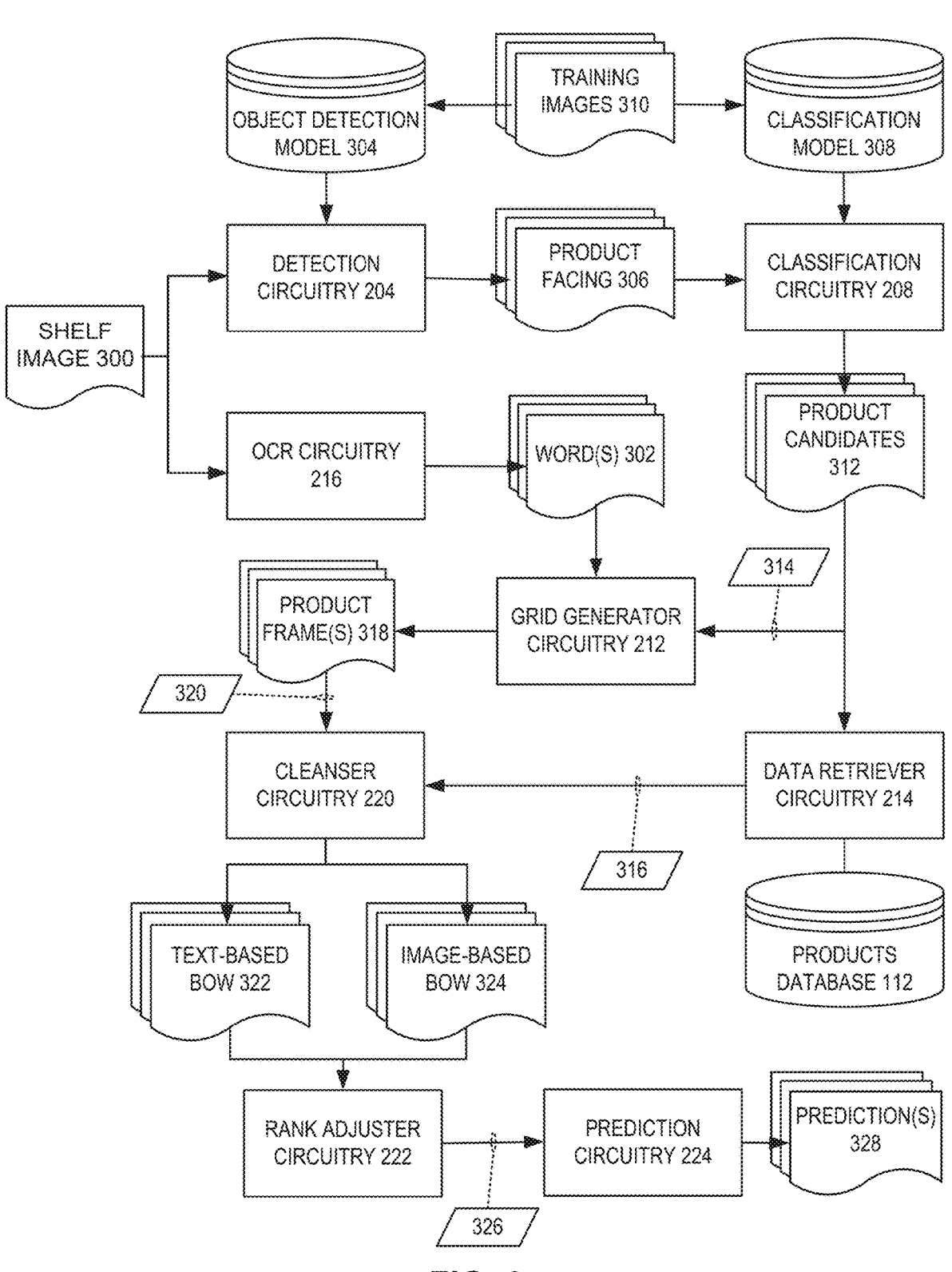
FIG. 3 is a block diagram of an example implementation of the example product recognition circuitry of FIGS. 1 and 2.

FIG. 3 illustrates an example implementation of the product recognition circuitry of FIGS. 1-2. The product recognition circuitry 104 of FIG. 3 obtains an example shelf image 300 (e.g., which may correspond to the shelf image 202 of FIG. 2) depicting a product(s). The product recognition circuitry 104 passes the shelf image 300 to the example OCR circuitry 216, which applies an OCR algorithm(s) to the shelf image 300 to extract example words 302. In particular, each word 302 includes a text string and a text box defining coordinates of the text string.

The product recognition circuitry 104 also passes the shelf image 300 to the example detection circuitry 204, which applies an example objection detection model 304 to the shelf image 300 to detect ROIs in the shelf image 202. In particular, the detection circuitry 204 executes the objection detection model 304 to detect example products facings 306 depicted in the shelf image 300. For example, the product facings 306 detected in the shelf image 300 can include an example first product facing (e.g., product facing A) corresponding to a first product, an example second product facing (e.g., product facing B) corresponding to a second product, etc. The detection circuitry 204 outputs coordinates of the products facings 306 detected in the shelf image 300 with their respective confidence scores.

The detection circuitry 204 passes the product facings 306 to the classification circuitry 208, which applies an example classification model 308 to the product facings 306 to recognize visual patterns in the product facings 306. In particular, the classification circuitry 208 executes the classification model 308 to classify the product facings based on the visual patterns. As illustrated in FIG. 3, the object detection model 304 and the classification model 308 have been trained (e.g., via the model trainer circuitry 116 of FIG. 1) based on example training images 310. For example, the training images 310 can be annotated images that include bounding boxes around respective products in scope (e.g., both grids and facings) and their respective product IDs.

The classification circuitry 208 applies the classification model 308 to the product facings 306 to generate (e.g., predict) respective example product candidates 312 (e.g., product IDs) and corresponding image-based confidence scores for the product facings 306. The classification circuitry 208 utilizes the image-based confidence scores to sort respective product candidates 312 in each product facing 306. The classification circuitry 208 outputs example image-based sets of product candidates 314, each of which include corresponding product candidates 312 sorted based on their image-based confidence scores.

Example table 1 below illustrates example data points (product ID, image-based confidence score) for detected product facing A and detected product facing B, which art sorted based their image-based confidence scores. That is, Table 1 includes a first column corresponding to product facing A, which includes an example image-based set of product candidates for a first product, and a second column corresponding to product facing B, which includes another example image-based set of product candidates for a second product.

TABLE 1

| | IMAGE-BASE SET OF PRODUCT CANDIDATES | | | |
| --- | --- | --- | --- | --- |
| | PRODUCT FACING A | | PRODUCT FACING B | |
| RANK | Product ID | Image-Based Confidence Score | Product ID | Image-Based Confidence Score |
| 1 | 24324 | 0.8 | 3396 | 0.9 |
| 2 | 98854 | 0.7 | 26594 | 0.63 |
| 3 | 22448 | 0.6 | 11589 | 0.6 |

To improve the accuracy of the product candidates 312 as predicted by the classification circuitry 208, the product candidates 312 are transmitted to the example data retriever circuitry 214. The data retriever circuitry 214 uses the product IDs to retrieve example product descriptions 316 for the product candidates 312, which are passed to the example cleanser circuitry 220. The data retriever circuitry 214 can retrieve one or more product characteristics (e.g., descriptions) 316 stored in the products database 112 and/or retrieve and aggregate characteristics to generate the product descriptions 316.

The product recognition circuitry 104 passes the shelf image 300 with the detected product facings 306 and the image-based sets of product candidates 314 to the example grid generator circuitry 212. The grid generator circuitry 212 groups the product facings 306 by product. In particular, the grid generator circuitry 212 uses distances between the product facings 306 (e.g., pixel-based distances) and the product candidates 312 with their image-based confidence scores to group the product facings 306 into one or more example product frames 318. The product frames 318 define respective a region (e.g., a bounding box) that encloses (e.g., covers, borders, etc.) corresponding ones of the product facings 306 assigned thereto. Thus, each product frame 318 corresponds to a respective product depicted therein, and includes corresponding product candidates 312 and their image-based confidence scores. For example, product facing A may be grouped with one or more additional product facings corresponding to the first product and/or product facing B may be grouped with one or more additional product facings corresponding to the second product.

Further, the grid generator circuitry 212 generates an example grid 320 (e.g., a grid of product frames) based on the product frames 318. In particular, the grid generator circuitry 212 defines the grid 320 relative to the shelf image 300 such that each product frame 318 corresponds to a respective grid region. For example, the product frames 318 can include an example first product frame (e.g., product frame A) corresponding to the first product and including, at least, product facing A. Further, the product frames 318 can include an example second product frame (e.g., product frame B) corresponding to the second product and including, at least, product facing B.

To improve accuracy of the product candidates 312 as predicted by the classification circuitry 208, the product recognition circuitry 104 provides the words 302 extracted by the OCR circuitry 216 to the grid generator circuitry 212. The grid generator circuitry 212 groups the words 302 by product by assigning each word 302 to the grid 320 based on relative two-dimensional locations of (a) the text boxes of those words 302 and (b) the product frames 318 of the grid 320. Thus, the grid generator circuitry 212 uses the product frames 318 to generate groups of OCR extracted words 302, and associates each group with its respective product frame 318. In some examples, the grid generator circuitry 212 adds the words 302 to the shelf image 300 with the grid 320.

The product recognition circuitry 104 provides the grid 320 having the OCR extracted words 302 as well as the product description(s) 316 extracted from the product database 112 to the cleanser circuitry 220. The product recognition circuitry 104 is thus able to take advantage of similarities between the OCR extracted words 302 assigned to the product frames 318 of the grid 320 and characteristics retrieved from the products database 112. To facilitate the comparison, the cleanser circuitry 220 generates example text-based BOWs 322 and example image-based BOWs 324 by applying one or more heuristics for text normalization and sanitization to the OCR extracted words 302 and/or the product descriptions 316. In particular, the cleanser circuitry 220 generates, for each product frame 318. (a) a text-based BOW 322 based on respective ones of the OCR extracted words 302 assigned to a given product frame 318, and (b) image-based BOWs 324 based on respective ones of the product descriptions 316 predicted for the given product frame 318. Thus, each image-based BOW 324 corresponding to a respective product candidate 312. Further, each text-based BOW 322 includes discriminative words extracted from a respective product's packaging, and each image-based BOW includes reference words corresponding to a respective product candidate 312.

The product recognition circuitry 104 provides the text-based BOW(s) 322 and the image-based BOW(s) 324 to the example rank adjuster circuitry 222. The rank adjuster circuitry 222 uses the BOWs 322, 324 to determine text similarity between discriminative words for a given product frame 318 and respective products descriptions predicted for the product frame 318. For example, the rank adjuster circuitry 222 can identify a first text-based BOW 322 corresponding to product frame A and first image-based BOWs 324 corresponding to the product frame A. The rank adjuster circuitry 222 compares different discriminative words in the first text-based BOW 322 to different reference words in each of the first image-based BOWs 324. In particular, the rank adjuster circuitry 222 analyzes different pairs of the reference words and the discriminative words to identify reference words associated with a Levenshtein distance that satisfies an example string distance threshold (e.g., two). These are matched reference words for the first reference BOWs. The rank adjuster circuitry 222 identifies matched reference words in the first image-based BOW 324 for product frame A, as well as for other image-based BOWs 324 for other product frames 318 in the grid 320.

The rank adjuster circuitry 222 determines a respective text similarity score for each product candidate 312 based on Levenshtein distances of the matched reference words and example TF-IDF values of the matched reference words. In particular, the rank adjuster circuitry 222 determines a TF-IDF value for a given matched reference word by multiplying a TF value (e.g., a term frequency of the matched reference word relative to a number of words in a corresponding image-based BOW 324) for the matched reference word by a corresponding IDF value. The rank adjuster circuitry 222 can determine the corresponding IDF value based on a number of image-based BOWs 324 associated with a corresponding product frame 318 and a number of those image-based BOWs 324 having the matched reference word. Further, the rank adjuster circuitry 222 can weigh a Levenshtein distance for the matched reference word based on its TF-IDF score.

The rank adjuster circuitry 222 can iterate through other matched words in the corresponding image-based BOW 324 to generate an example weighted Levenshtein distance (e.g., a weighted string distance) for each matched reference word for the corresponding image-based BOW 324. To generate a text similarity score for the corresponding image-based BOW, the rank adjuster circuitry 222 determines a weighted sum of the weighted Levenshtein distances. In particular, a contribution of each matched reference word to the text similarity score is weighted by the inverse of the Levenshtein distance to foster matches with lower distances. Thus, the rank adjuster circuitry 222 determines a text similarity score for the image-based BOW 324, which corresponds to a respective product candidate 312. The rank adjuster circuitry 222 can iterate through other image-based BOWs of a corresponding product frame 318 to generate a respective text similarity score for each product candidate 312. Further, rank adjuster circuitry 222 can iterate through other product frames 318 of the shelf image 300 to generate respective text similarity scores for corresponding predicted product candidates 312.

The rank adjuster circuitry 222 generates example text-based confidence scores for the product candidate 312 assigned the product frames 318 by normalizing the text similarity scores of the image-based BOWs 324. In this example, the rank adjuster circuitry 222 normalizes ones of the text similarity scores relative to their respective image-based BOW 324. In particular, the rank adjuster circuitry 222 determines a maximum text similarity score associated with a given product frame 318, and divides each corresponding text similarity score by the maximum. Thus, the rank adjuster circuitry 222 generates a respective text-based confidence score (e.g., in an interval between zero and one) for each product candidate 312 predicted for the given product frame 318. In some examples, the rank adjuster circuitry 222 iteratively determines text-based confidences scores for the product candidates 312 in the grid 320 of the shelf image 300.

The rank adjuster circuitry 222 outputs example text-based sets of product candidates 326, each of which include respective product candidates 312 sorted based on their text-based confidence scores. Thus, a given text-based set of product candidates 326 output by the rank adjuster circuitry 222 can be a re-arranged version of a corresponding image-based set of product candidates 314 output by the classification circuitry 208. For example, example table 2 below illustrates example data points for product candidates predicted for product frame A. In particular, Table 2 includes a first column corresponding to an image-based set of product candidates for product frame A, and a second column corresponding to a text-based set of product candidates for product frame A.

TABLE 2

| | IMAGE-BASE AND TEXT-BASED SETS OF PRODUCT CANDIDATES FOR PRODUCT FRAME A | | | |
| --- | --- | --- | --- | --- |
| | PRODUCT FRAME A | | PRODUCT FRAME A | |
| RANK | Product ID | Image-Based Confidence Score | Product ID | TEXT-Based Confidence Score |
| 1 | 24324 | 0.8 | 98854 | 0.89 |
| 2 | 98854 | 0.7 | 24324 | 0.79 |
| 3 | 22448 | 0.6 | 22448 | 0.56 |

As depicted in Table 2, a given text-based set of product candidates 326 output by the rank adjuster circuitry 222 can be a re-arranged version of a corresponding image-based set of product candidates 314 output by the classification circuitry 208. However, in other examples, a text-based set of product candidates 326 can be re-arranged in another manner or can be arranged substantially similar to the image-based set of product candidates 314 (e.g., thereby confirming the image-based set of product candidates 314). The product recognition circuitry 104 passes the shelf image 300 having the grid 320, the image-based set of product candidates 314, and the text-based set of product candidates 326 to the example prediction circuitry 224.

The prediction circuitry 224 determines an example merged score for each product candidates 312 by performing prediction fusion using the two confidence scores (one based on text and another one based on image) for the product candidates 312 predicted by the classification circuitry 208 for each product frame 318. In particular, for each product candidate 312 predicted for a given product frame 318, the prediction circuitry 224 determines a harmonic mean between corresponding image-based and text-based confidence scores.

For each product candidate 312 predicted by the classification circuitry 208, the prediction circuitry 224 integrates (e.g., incorporates, combines, et.) similarities between discriminative words extracted from a packing depicted in the shelf image 300 and reference words extracted from the products database 112 into a final confidence score for the product candidate 312, without harming the original image-based confidence scores generated by the classification circuitry 208. In this example, the prediction circuitry 224 determines a respective final confidence score for each product candidate 312 based on a maximum of (a) a respective image-based confidence score, and (b) a respective merged score. The prediction circuitry 224 generates a respective final set of product candidates for each product frame 318 based on the final confidence scores.

The prediction circuitry 224 outputs an example prediction(s) 328 for the shelf image 300. In some examples, the prediction 328 can correspond to the final sets of product candidates for the product frames 318 in the shelf image 300. In some examples, the prediction 328 includes a first-ranked product candidates of each final set of product candidates of the product frames 318. For example, the prediction circuitry 224 associated a respective first-ranked product candidate with each corresponding product frame 318 on the grid 320 of the shelf image 300 and output the shelf image 300 as the prediction 328. In some examples, the prediction 328 is a report based on the final sets of product candidates for the shelf image 300.

In some examples, the prediction circuitry 224 stores the prediction(s) 328 in a database. In some examples, the prediction circuitry 224 associates a first ranked product candidate (e.g., product ID) with its respective product frame 318. In some examples, the prediction(s) circuitry 224 generates a report based on the predictions for the product frames 318 in the grid 320.

Figure 4:
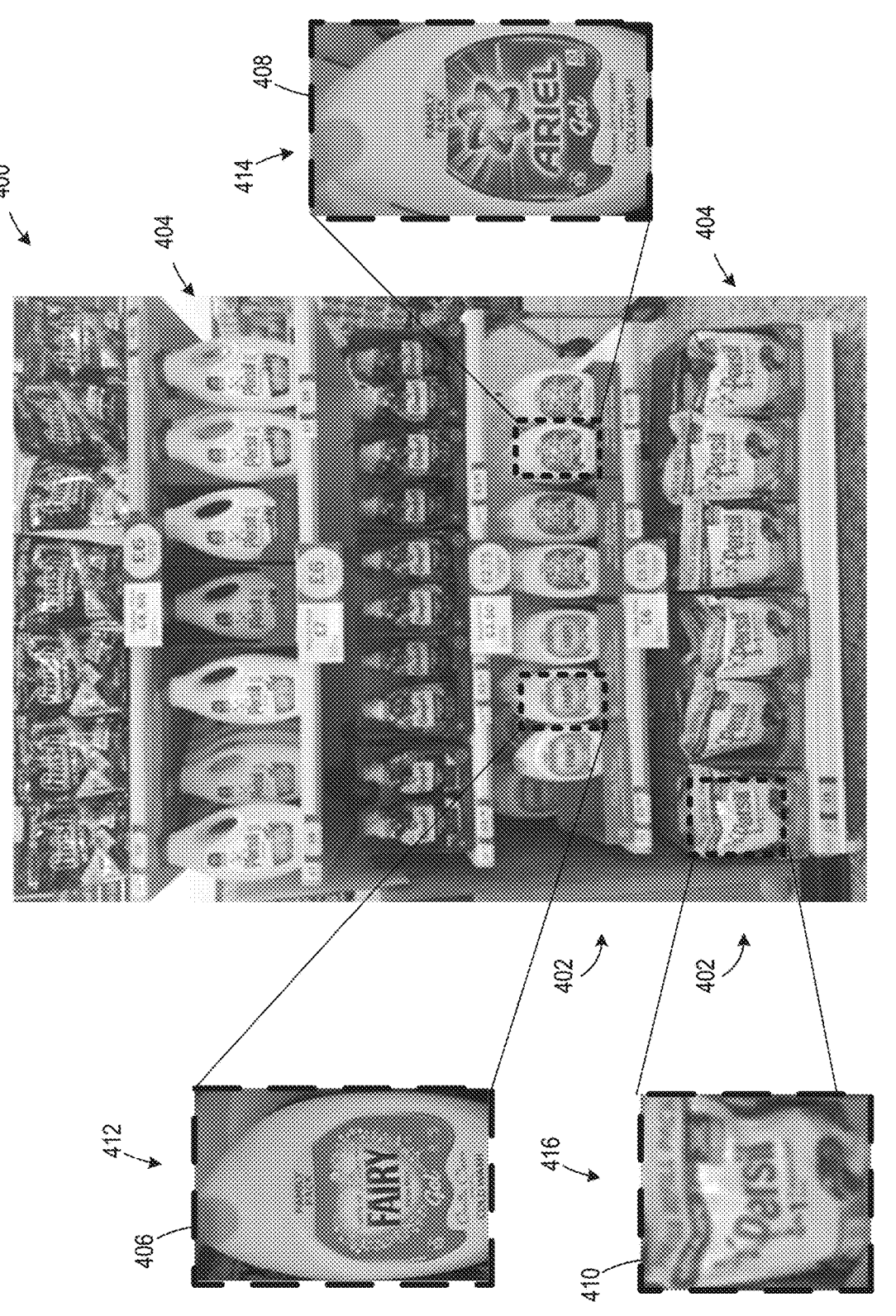
FIG. 4 is an example shelf image, including exploded views of example product facings detected therein.

FIG. 4 illustrates a first example shelf image 400 (e.g., which may correspond to the shelf image 202 of FIG. 2 or the shelf image 300 of FIG. 3) on which example product recognition circuitry 104 disclosed herein can be implemented. The shelf image 400 includes example shelves 402, each of which includes a plurality of products 404 positioned thereon. For example, the shelf image 400 may be an image captured by an audit device 110 (FIG. 1) and/or obtained from the image database 108 (FIG. 1). Generally, retailers (e.g., stores, retail establishments, etc.) organize shelves such that labels of products position thereon face forward (e.g., towards customers) and are placed towards a front of a shelf on which they are placed. This is a common practice in the retail industry due to the psychological effects that a well laid-out shelf has on customers, which ultimately contributes to sales. In particular, a neat and organized shelf space is visibly inviting, and can make a shelf appear perfectly stocked regardless of a stock level. This is illustrated in the shelf image 400 of FIG. 4.

The shelf image 400 of FIG. 4 includes, at least, an example first product facing 406, an example second product facing 408, and an example third product facing 410. In particular, the first, second, and third product facings 406, 408, 410 depict an example first product 412, an example second product 414, and an example third product 416, respectively. Although not described, the shelf image 400 of FIG. 4 includes additional product facings corresponding to the same and/or additional products.

The product facings 406, 408, 410 are detected by the detection circuitry 204, and passed to the classification circuitry 208 to be classified. In particular, the classification circuitry 208 predicts product candidates for each of the product facings 406, 408, 410 based on respective visual features extracted therefrom. Further, the product facings 406, 408, 410 and their predicted product candidates (including confidence scores corresponding thereto) are passed to the grid generator circuitry 212. which is structured to generate example product frames (e.g., product frames 502-506 of FIG. 5).

Figure 5:
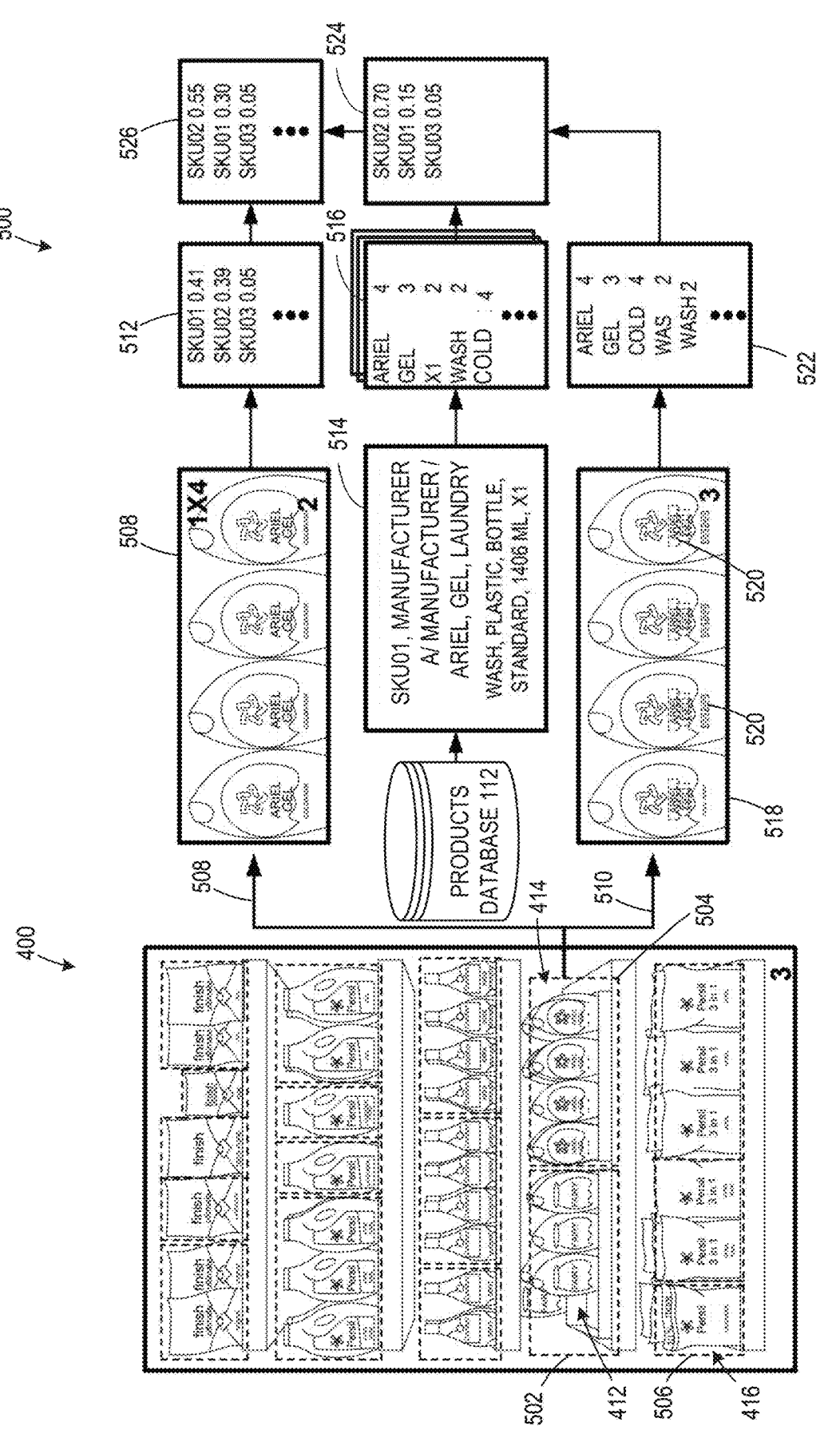
FIG. 5 is a schematic illustration of an example implementation of the example product recognition circuitry of FIGS. 1-3.

FIG. 5 is a schematic illustration of an example implementation 500 of the product recognition circuitry 104 of FIGS. 1-3 to the recognize products 412, 414, 416 depicted in the product facings 406, 408, 410 of the shelf image 400 of FIG. 4. FIG. 5 illustrates an example first product frame 502, an example second product frame 504, and an example third product frame 506. Although not described, the shelf image 400 of FIG. 4 includes additional product frames corresponding to the same and/or additional products. The first product frame 502 corresponds to the first product 412, the second product frame 504 corresponds to the second product 414, and the third product frame 506 corresponds to the third product 416. As illustrated in FIG. 5, the third product frame 506 corresponds to the third product facing 410 (FIG. 4) because the third product facing 410 was not grouped with other product facings.

FIG. 5 illustrates an example first (e.g., CV-based, image-based, etc.) path 508 and an example second (e.g., NLP-based, text-based, etc.) path 510 of the second product frame 504. As illustrated in FIG. 5, the second product frame 508 is passed along the image-based path 508 and the text-based path 510. The second product frame 508 includes one row and four columns (e.g., 1×4). As illustrated, the classification circuitry 208 generates an example image-based set of product candidates 512 corresponding to the second product frame 508. For example, the image-based set of product candidates 512 includes example SKU01, which includes an example image-based confidence score of 0.41, example SKU02, which includes an example image-based confidence score of 0.39, example SKU03, which includes an example image-based confidence score of 0.05, etc. That is, the product candidates predicted by the classification circuitry 208 are ranked/sorted by their confidence scores.

Further, the data retriever circuitry 214 obtains the image-based set of product candidates 512 and retrieves an example product description(s) 514 for the product candidates in the image-based set of product candidates 512. For example, the data retriever circuitry 214 obtains the product description(s) 514 from the products database 112. The cleanser circuitry 220 obtains the product descriptions and generates an example image-based (e.g., reference) BOW(s) 516 for each product candidate.

Along the second path 508, the shelf image 400 is passed to the OCR circuitry 216, which is structured to generate an example OCR output 518. The OCR output 518 includes machine readable words (e.g., text) 520 represented by example text boxes. In particular, each text box corresponds to a respective word 520. Further, the grid generator circuitry 212 assigned each word 520 to a respective product frame 502, 504, 506. As illustrated in FIG. 5, the second product frame 504 includes a plurality of words 520 assigned thereto. The cleanser circuitry 220 obtains the OCR output 518 and generates an example text-based (e.g., product) BOW 522 for the product frame 504. Thus, the text-based BOW 522 includes discriminative words extracted from a respective product's packaging. The product recognition circuitry 104 is thus able to take advantage of similarities between the OCR extracted words 520 assigned to the product frame 504 and characteristics retrieved from the products database 112.

The rank adjuster circuitry 222 obtained the text-based BOW 522 and the image-based BOWs 516 and generates an example text-based set of product candidates 524. For example, the text-based set of product candidates 524 includes example SKU02, which includes an example text-based confidence score of 0.70, example SKU01, which includes an example text-based confidence score of 0.15, example SKU03, which includes an example text-based confidence score of 0.05, etc. That is, the product candidates are re-ranked by their text-based confidence scores.

The prediction circuitry 224 obtains image-based set of product candidates 512 and the text-based set of product candidates 524. The prediction circuitry 224 merges ones of the image-based confidence score with respective ones of the text-based confidence scores to determine merged scores. Further, the prediction circuitry 224 generates an example final set of product candidates 526 based on the merged scores and the image based confidence score. For example, the final set of product candidates 526 includes example SKU02, which includes an example final confidence score of 0.55, example SKU01, which includes an example final confidence score of 0.30, example SKU03, which includes an example text-based confidence score of 0.05, etc. In some examples, the final confidence scores are based on a maximum between a respective merged score and a respective image-based confidence score. As illustrated in FIG. 5, the product recognition circuitry 104 combines/merges results from the CV-based path 508 and the NPL-based path 510 to improve an accuracy of the predictions.

While an example manner of implementing the product recognition circuitry 104 of FIG. 1 is illustrated in FIGS. 1-3, one or more of the elements, processes, and/or devices illustrated in FIGS. 1-3 may be combined, divided, re-arranged, omitted, eliminated, and/or implemented in any other way. Further, the example report generator circuitry 114, the example detection circuitry 204, the example classification circuitry 208, the example grid generator circuitry 212, the example data retriever circuitry 214, the example OCR circuitry 216, the example cleanser circuitry 220, the example rank adjuster circuitry 222, the example prediction circuitry 224, and/or, more generally, the example product recognition circuitry 104 of FIGS. 1-3, may be implemented by hardware alone or by hardware in combination with software and/or firmware. Thus, for example, any of the example report generator circuitry 114, the example detection circuitry 204, the example classification circuitry 208, the example grid generator circuitry 212, the example data retriever circuitry 214, the example OCR circuitry 216, the example cleanser circuitry 220, the example rank adjuster circuitry 222, the example prediction circuitry 224, and/or, more generally, the example product recognition circuitry 104, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example product recognition circuitry 104 of FIGS. 1-3 may include one or more elements, processes, and/or devices in addition to, or instead of, those illustrated in FIGS. 1-3, and/or may include more than one of any or all of the illustrated elements, processes and devices.

Figure 6:
FIG. 6 is an example shelf image on which the example image recognition circuitry of FIGS. 1-3 can be applied to recognize products.
Figure 7:
FIG. 7 is another example shelf image on which the example image recognition circuitry of FIGS. 1-3 can be applied to recognize products.

FIGS. 6 and 7 illustrate example shelf images that can be analyzed by the example product recognition circuitry 104 of FIGS. 1-5. In particular, FIG. 6 illustrates a second example shelf image 600 (e.g., which may correspond to the shelf image 202 of FIG. 2 or the shelf image 300 of FIG. 3) and FIG. 7 illustrates a third example shelf image 700 (e.g., which may correspond to the shelf image 202 of FIG. 2 or the shelf image 300 of FIG. 3). As illustrated, the shelf images 600, 700 include blurry areas that limit the discriminative power of image-based recognition. However, OCR engines has been shown to provide accurate results for such discriminate text. Thus, combining image-based predictions and text-based predictions can improve an accuracy of product recognition on these shelf image 600, 700.

Flowchart(s) representative of example machine readable instructions, which may be executed by programmable circuitry to implement and/or instantiate the product recognition circuitry 104 of FIGS. 1-3 and/or representative of example operations which may be performed by programmable circuitry to implement and/or instantiate the product recognition circuitry 104 of FIGS. 1-3, are shown in FIGS. 8-13. The machine readable instructions may be one or more executable programs or portion(s) of one or more executable programs for execution by programmable circuitry such as the programmable circuitry 1412 shown in the example processor platform 1400 discussed below in connection with FIG. 14 and/or may be one or more function(s) or portion(s) of functions to be performed by the example programmable circuitry (e.g., an FPGA) discussed below in connection with FIGS. 15 and/or 16. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 8-13, many other methods of implementing the example product recognition circuitry 104 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-13 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A. (2) at least one B. or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed, instantiated, and/or performed by programmable circuitry to recognize one or more products depicted on an image of a shelf captured by an auditing device. The example machine-readable instructions and/or the example operations 800 of FIG. 8 begin when example product recognition circuitry 104 obtains a shelf image (e.g., shelf image 202 of FIG. 2, shelf image 300 of FIG. 2, shelf image 400 of FIG. 4, etc.).

At block 802, example detection circuitry 204 detects a region(s) of interest (ROIs) in the shelf image 202, 300, 400. In this example, the ROI(s) o corresponds to a product facing(s) of a product(s) depicted in the shelf image 202, 300, 400. For example, the detection circuitry 204 can apply an AI-based object detection model 304 trained to detect (e.g., generic) product facings. The detection circuitry 204 outputs one or more product facings.

At block 804, example classification circuitry 208 classifies the ROI(s) to generate a respective image-based set(s) of product candidates for the ROI(s) detected in the shelf image 202, 300, 400. For example, the classification circuitry 208 applies an example classification model 308 to each ROI of detected in the shelf image 202, 300, 400 to generate example product candidates, and sorts the product candidates based on their respective image-based confidence scores. The classification circuitry 208 outputs a respective image-based set of product candidates for each ROI detected in the shelf image 202, 300, 400.

At block 806, example grid generator circuitry 212 generates an example grid on the shelf image 202, 300, 400, which includes one or more example, each of which bounds a ROI(s) corresponding to a same product. In particular, the grid generator circuitry 212 groups ones of the product facings detected in the shelf image 202, 300, 400 by product based on distances between the product facings and the predicted product candidates in the image-based sets of product candidates.

At block 808, the grid generator circuitry 212 assigns words extracted from the shelf image 202, 300, 400 to the grid based on coordinates of the words and coordinates of the product frame(s). For example, the grid generator circuitry 212 can obtain an output from example OCR circuitry 216 that includes words (e.g., machine readable text, product words, etc.) extracted the shelf image 202, 300, 400. For example, the output of the OCR circuitry 216 can include words recognized in product packaging depicted in the shelf image 202, 300, 400 and extracted by the OCR circuitry 216, along with their confidence scores and coordinates of their bounding boxes. The grid generator circuitry 212 can use IoU calculations, heuristics, and/or other techniques to assign the OCR extracted words to the grid.

At block 810, the product recognition circuitry 104 selects a product frame from the grid. The product recognition circuitry 104 generates a first bag of words (BOW) for the product frame based on text depicted in the shelf image 202, 300, 400 (e.g., block 812). An example implementation of block 812 is discussed in further detail below in relation to FIG. 10. The product recognition circuitry 104 also generates a respective second BOW for each product candidate in a corresponding image-based set of product candidates based on product characteristics of the product candidates (e.g., block 814). An example implementation of block 814 is discussed in further detail below in relation to FIG. 11.

At block 816, example rank adjuster circuitry 222 evaluates text similarities between the first BOW and each second BOW to generate a text-based set of product candidates for the product frame. For example, the rank adjuster circuitry 222 can determine a text-based confidence score based on a normalized text similarity score for a given product candidate. An example implementation of block 816 is described in further detail below in relation to FIG. 12.

At block 818, example prediction circuitry 224 merges the text-based set of product candidates and the image-based set of product candidates to generate an example final set of product candidates for the product frame. For example, the prediction circuitry 224 can iteratively determine a respective harmonic mean between a text-based confidence score and a corresponding image-based confidence score for a given product candidate. In some examples, the prediction circuitry 224 determines a final confidence score for a given product candidate by selecting a large value between a respective image-based confidence score for the product candidate and a respective merged score for the product candidate. An example implementation of block 818 is described in further detail below in relation to FIG. 13.

At block 820, the prediction circuitry 224 associates a first product candidate in the final set of product candidates with the product frame. For example, the prediction circuitry 224 can associated a product ID of the first ranked product candidate with the selected product frame. In some examples, the prediction circuitry 224 cross-codes the shelf image 202, 300, 400 such that the product frame is associated with the product ID for the first ranked product candidate in the products database 112.

At block 822, the product recognition circuitry 104 determines whether to select another product frame. For example, the product recognition circuitry 104 can iterate through the product frames of the grid on the shelf image 202, 300, 400. When each product frame has been analyzed, the product recognition circuitry 104 can determine that the answer to block 822 is NO, and the process ends. On the other hand, if another product frame has yet to be analyzed, the product recognition circuitry 104 can determine the answer to block 822 is YES. When the answer to block 822 is YES, control returns to block 810.

FIG. 9 is a flowchart representative of example machine readable instructions and/or example operations 804 that may be executed, instantiated, and/or performed by programmable circuitry to classify the ROI(s) to generate the respective image-based set of product candidates for the ROI(s) detected in the shelf image 202, 300, 400. The example machine-readable instructions and/or the example operations 804 of FIG. 9 begin at block 902, at which the classification circuitry 208 selected a detected ROI detected by the detection circuitry 204. In other words, the classification circuitry 208 selects a product facing recognized by the detection circuitry 204, which is bound by corresponding coordinates relative to the shelf image 202, 300, 400.

At block 904, the classification circuitry 208 applies an example image-based classification model (e.g., image-based classification model 308 of FIG. 3, etc.) to the selected ROI to predict different product candidates. For example, the classification circuitry 208 can extract visual features from the product facing based on pixels and/or areas of pixels therein and attempt to match the extracted features to reference features of one or more products learned during a training phase (e.g., based on reference images of consumer packaged goods). In some examples, each product candidate in is associated with a unique product identifier (e.g., a UPC, an EAN, a SKU, a ID, etc.) that can be used to identify product in the products database 112. In some examples, the classification circuitry 208 assigns a respective confidence score to each product candidate indicative of a likelihood or probability that the prediction is accurate. In some examples, the classification circuitry 208 identifies predetermined number of the product candidates (e.g., 5, 10, etc.).

At block 906, the classification circuitry 208 sorts the product candidates based on respective confidence scores associated with the predictions, which represent image-based confidence scores for the product candidates. The classification circuitry 208 sorts the product candidates based on the image-based confidence scores to generate an example image based set of product candidates. In some examples, the classification circuitry 208 sorts the product candidates numerically based on their image-based confidence scores.

At block 908, the classification circuitry 208 of FIG. 2 outputs the image-based set of product candidates corresponding to the selected ROI. For example, the classification circuitry 208 can output a ranked list of the product candidates with their corresponding image-based confidence scores. At block 910, the classification circuitry 208 determines whether to select another ROI detected in the shelf image 202, 300, 400. For example, the classification circuitry 208 can iterate through the ROI detected in the shelf image 202, 300, 400. When each ROI has been analyzed, the classification circuitry 208 can determine that the answer to block 908 is NO, at which control returns to block 806. On the other hand, if another ROI has yet to be classified, the classification circuitry 208 can determine the answer to block 908 is YES. When the answer to block 908 is YES, control returns to block 902.

FIG. 10 is a flowchart representative of example machine readable instructions and/or example operations 812 that may be executed, instantiated, and/or performed by programmable circuitry to generate the first BOW for the selected product frame based on text depicted in the shelf image 202, 300, 400. The product recognition circuitry 104 includes example cleanser circuitry 220 to identify meaningful (e.g., discriminative) words extracted from the shelf image 202. For example, the meaningful words can correspond to product line differentiators such as (but not limited to) flavor, scent, size, brand, special claims, etc. In particular, the cleanser circuitry 220 applies one or more heuristics for text normalization and sanitization to OCR extracted words assigned to a given product frame to generate a respective first bag-of-words (BOW) for the product frame.

The example machine-readable instructions and/or the example operations 812 of FIG. 10 begin at block 1002, at which the cleanser circuitry 220 identifies OCR extracted words assigned to the selected product frame. For example, the cleanser circuitry 220 identifies OCR extracted words assigned to a corresponding region of the grid. At block 1004, the cleanser circuitry 220 removes ones of the OCR extracted words having an OCR confidence score that satisfies a OCR confidence threshold (e.g. 0.5, etc.). In some examples, the cleanser circuitry 220 can remove OCR extracted words associated with an OCR confidence at or below 50 percent (e.g., 0.5).

At block 1006, the cleanser circuitry 220 removes ones of the words having a text string that satisfies a character length threshold (e.g., four). In some examples, the cleanser circuitry 220 removes ones of the OCR extracted words having character length less than four. At block 1008, the cleanser circuitry 220 removes non-standard characters from remaining OCR detected words. For example, the cleanser circuitry 220 can remove non-Unicode characters and/or punctuation signs. At block 1010 In some examples, the cleanser circuitry 220 removes duplicate ones of the remaining OCR extracted words (e.g., OCR detected words that appear in each bag linked to a product frame). This is because such duplicative OCR detected words typically come from multiple facings with the same orientation on the same grid.

At block 1012, the cleanser circuitry 220 outputs the remaining OCR extracted words as the first BOW for the selected product frame. Each word in the first BOW for the selected product frame, which includes discriminative words that can be used to distinguish between the product candidates predicted for the product frame, has a frequency of one. At block 1014, the cleanser circuitry 220 associates the resulting first BOW with the selected product frame. Control then returns to block 814.

FIG. 11 is a flowchart representative of example machine readable instructions and/or example operations 814 that may be executed, instantiated, and/or performed by programmable circuitry to generate the respective second BOW for each product candidate in the corresponding image-based set of product candidates based on the product characteristics of the product candidates. The example machine-readable instructions and/or the example operations 814 of FIG. 11 begin at block 1102, at which example data retriever circuitry 214 retrieves respective product characteristics for corresponding to ones of the product candidates in the image-based set of product candidates for the selected product frame. In particular, the product recognition circuitry 104 passes the product IDs predicted for the selected product frame to the 214, which uses the product IDs to retrieve information from the products database 112. For example, the 214 can retrieve product characteristics and/or descriptions of products stored in the products database 112.

At block 1104, the cleanser circuitry 220 selects a product candidate and identifies a respective product characteristics for the selected product candidate, which includes reference words. At block 1106, the cleanser circuitry 220 removes ones of the reference words having a text string that satisfies a character length threshold (e.g., four). In some examples, the cleanser circuitry 220 removes ones of the reference words having character length less than four.

At block 1108, the cleanser circuitry 220 removes non-standard characters from remaining reference words. For example, the cleanser circuitry 220 can remove non-Unicode characters and/or punctuation signs. At block 1110, the cleanser circuitry 220 determines occurrences of the remaining reference words. In particular, the cleanser circuitry 220 determines a frequency that each reference word that remains in the product characteristics. Thus, the cleanser circuitry 220 generates the second BOW for the selected product candidate.

At block 1112, the cleanser circuitry 220 associates the resulting second BOW with the selected product candidate in the selected product frame to facilitate comparison of the second BOW with the first BOW. At block 1114, the cleanser circuitry 220 determines whether to select another product candidate from the image-based set of product candidate. For example, when the cleanser circuitry 220 has iterated through the product candidates in the image-based set of product candidates, the cleanser circuitry 220 can determine that the answer to block 1114 is NO, at which control returns to block 816. On the other hand, if a second BOW has yet to be generated for another product candidate, the cleanser circuitry 220 can determine the answer to block 1114 is YES. When the answer to block 1114 is YES, control returns to block 1104.

FIG. 12 is a flowchart representative of example machine readable instructions and/or example operations 816 that may be executed, instantiated, and/or performed by programmable circuitry to evaluate text similarities between the first BOW and each second BOW to generate a text-based set of product candidates for the product frame. The example machine-readable instructions and/or the example operations 816 of FIG. 12 begin at block 1202, at which the rank adjuster circuitry 222 selects a product candidate corresponding to the selected product frame. At block 1204, the rank adjuster circuitry 222 identifies a second BOW corresponding to the selected second product candidate from ones of the second BOWs associated with the selected product frame. The second BOW corresponding the selected product frame includes occurrences of reference words extracted from the products database 112.

At block 1206, the rank adjuster circuitry 222 evaluated the reference words in the second BOW against discriminative words in the first BOW to determine matched reference words, the matched reference words having a string distance that satisfies a string distance threshold. The first BOW includes the discriminative words that can be used to distinguish between the product candidates predicted for the selected frame. In this example, the rank adjuster circuitry 222 compares each discriminative word in the first BOW to each reference word in the second BOW to identify ones of the reference words associated with a Levenshtein distance that satisfies the string distance threshold (e.g., two). For example, the rank adjuster circuitry 222 may remove ones of the reference words having a Levenshtein distance greater than two. At block 1208, the rank adjuster circuitry 222 determines a respective term frequency (TF) value for each matched reference word. For example, the rank adjuster circuitry 222 determines an occurrence of the matched reference word in the second BOW relative to a number of reference words in the second BOW.

At block 1210, the rank adjuster circuitry 222 determines whether to select another product candidate. In particular, the rank adjuster circuitry 222 iterates through each product candidate assigned to the selected product candidate. If another second BOW has yet to be evaluated, the answer to block 1210 is YES, and control returns to block 1202. When the answer to block 1210 is NO (e.g., each second BOW associated with the selected product frame has been evaluated), control advances to block 1212.

At block 1212, the rank adjuster circuitry 222 determines a respective TF-IDF for each matched reference word. For example, the rank adjuster circuitry 222 determines an IDF value for a given matched word based on a number of second BOWs associated with the selected product frame relative to an occurrence of the second BOWs having the matched reference word. Further, the rank adjuster circuitry 222 multiplies the IDF value for the given word by its respective TF value.

At block 1214, the rank adjuster circuitry 222 determines a respective text similarity score for each product candidate based on corresponding ones of the string distances and TF-IDF values. For example, the rank adjuster circuitry 222 identifies matched reference words for a given product candidate, and weighs each corresponding string distance by its respective TF-IDF value. In some examples, the rank adjuster circuitry 222 removes ones of the matched reference words having a weighted string distance that satisfies a string similarity threshold. For example, the string similarity threshold may be an empirically determined threshold. Further, the rank adjuster circuitry 222 generates a text similarity score for the given product candidate using a weighted sum of weighted string distances, wherein the weighted string distances are further weighed by respective inverses of their string distances (e.g., Levenshtein distances). The rank adjuster circuitry 222 generates a text similarity score for each product candidate.

At block 1216, the rank adjuster circuitry 222 generates text-based confidence scores for the product candidates by normalizing the text similarity scores. For example, the rank adjuster circuitry 222 can normalize the text similarity scores by dividing each of the text similarity scores by a maximum text similarity of the product candidates. At block 1218, the rank adjuster circuitry 222 sorts the product candidates based on the text-based confidence scores to generate the text-based set of product candidates for the selected product frame. Control then returns to block 818.

FIG. 13 is a flowchart representative of example machine readable instructions and/or example operations 818 that may be executed, instantiated, and/or performed by programmable circuitry to merge the text-based set of product candidates and the image-based set of product candidates to generate an example final set of product candidates for the product frame. The example machine-readable instructions and/or the example operations 818 of FIG. 13 begin at block 1302, at which the prediction circuitry 224 selects a product candidate associated with the selected product frame. At block 1304, the prediction circuitry 224 selected an image-based confidence score for the selected product candidate and a text-based confidence score for the selected product candidate. At block 1306, the prediction circuitry 224 calculates a mean of the image-based confidence score and the text-based confidence score for the selected product candidate. For example, the prediction circuitry 224 can merge the image-based confidence score and the text-based confidence score for the selected product candidate based on the mean. At block 1308, the prediction circuitry 224 selects a maximum of the mean of the product candidate and the image-based confidence score to be final confidence score for the selected product candidate.

At block 1310, the prediction circuitry 224 determines whether to select another product candidate. In particular, the prediction circuitry 224 iterates through each product candidate assigned to the selected product frame. If another product candidate has yet to be evaluated, the answer to block 1310 is YES, and control returns to block 1302. When the answer to block 1310 is NO (e.g., each product candidate includes a final confidence score), control advances to block 1312. At block 1312, the prediction circuitry 224 sorts the product candidates based on the final confidence scores to generate the final set of product candidates for the selected product frame. Control then returns to block 820.

Figure 14:
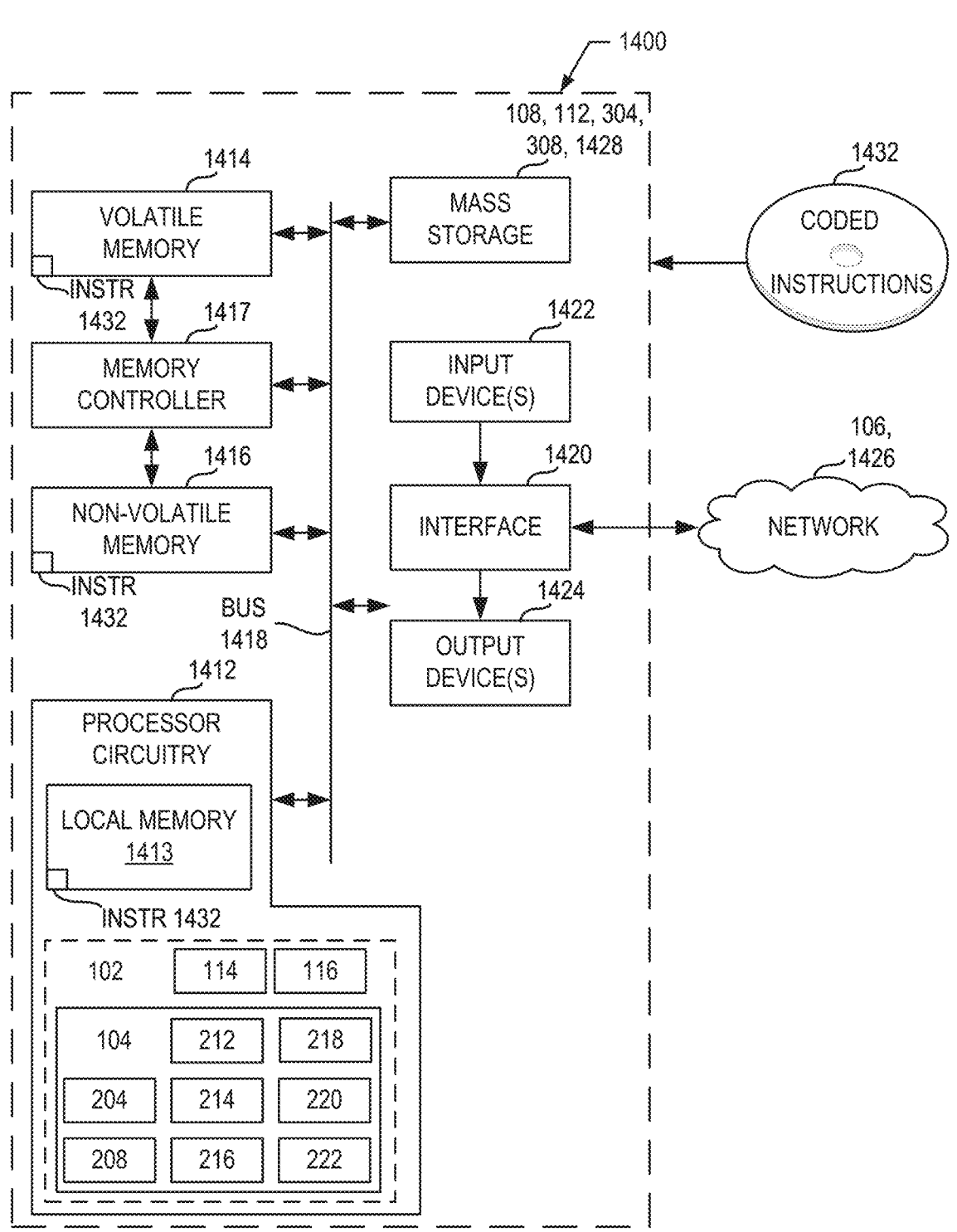
FIG. 14 is a block diagram of an example processing platform including programmable circuitry structured to execute, instantiate, and/or perform the example machine readable instructions and/or perform the example operations of FIGS. 8-13 to implement the product recognition circuitry 104 of FIGS. 1-3.

FIG. 14 is a block diagram of an example programmable circuitry platform 1400 structured to execute and/or instantiate the example machine-readable instructions and/or the example operations of FIGS. 8-13 to implement the product recognition circuitry 104 of FIGS. 1-3. The programmable circuitry platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, and/or microcontrollers from any desired family or manufacturer. The programmable circuitry 1412 may be implemented by one or more semiconductor based (e.g., silicon based) devices. In this example, the programmable circuitry 1412 implements the example report generator circuitry 114, example detection circuitry 204, example classification circuitry 208, example grid generator circuitry 212, example data retriever circuitry 214, example OCR circuitry 216, example cleanser circuitry 220, example rank adjuster circuitry 222, and example prediction circuitry 224.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user (e.g., a human user, a machine user, etc.) to enter data and/or commands into the programmable circuitry 1412. The input device(s) 1422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426 (e.g., which may correspond to the network 106 of FIG. 1). The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1400 of the illustrated example also includes one or more mass storage discs or devices 1428 to store firmware, software, and/or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1432, which may be implemented by the machine readable instructions of FIGS. 8-13, may be stored in the mass storage device 1428, in the volatile memory 1414, in the non-volatile memory 1416, and/or on at least one non-transitory computer readable storage medium such as a CD or DVD which may be removable.

Figure 15:
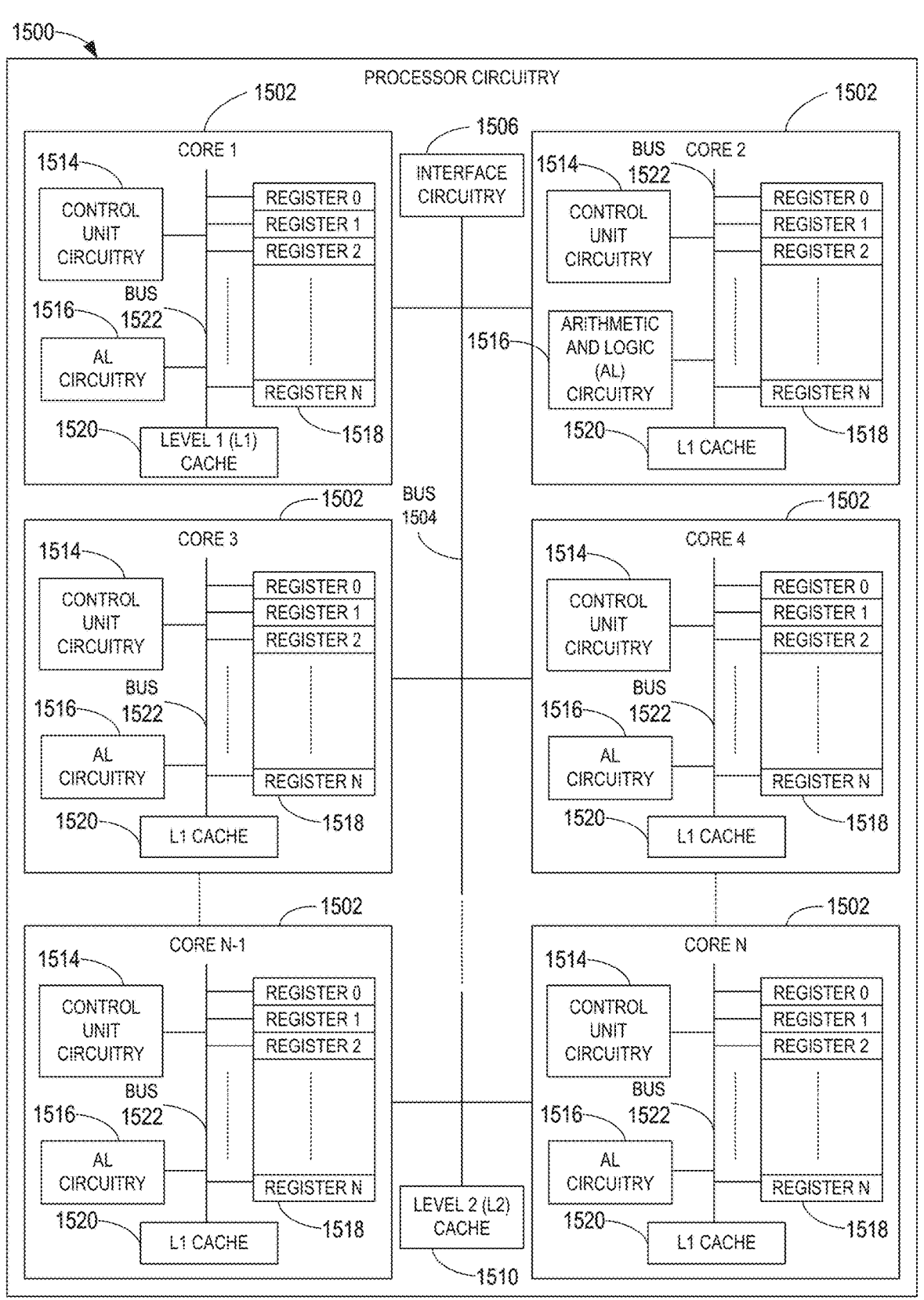
FIG. 15 is a block diagram of an example implementation of the programmable circuitry of FIG. 14.

FIG. 15 is a block diagram of an example implementation of the programmable circuitry 1412 of FIG. 14. In this example, the programmable circuitry 1412 of FIG. 14 is implemented by a microprocessor 1500. For example, the microprocessor 1500 may be a general-purpose microprocessor (e.g., general-purpose microprocessor circuitry). The microprocessor 1500 executes some or all of the machine-readable instructions of the flowcharts of FIGS. 8-13 to effectively instantiate the circuitry of FIG. 2 as logic circuits to perform operations corresponding to those machine readable instructions. In some such examples, the circuitry of FIGS. 1-3 is instantiated by the hardware circuits of the microprocessor 1500 in combination with the machine-readable instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 8-13.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Additionally or alternatively, the first bus 1504 may be implemented by any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating-point operations. In yet other examples, the AL circuitry 1516 may include first AL circuitry that performs integer-based operations and second AL circuitry that performs floating-point operations. In some examples, the AL circuitry 1516 may be referred to as an Arithmetic Logic Unit (ALU).

The registers 1518 are semiconductor-based structures to store data and/or instructions such as results of one or more of the operations performed by the AL circuitry 1516 of the corresponding core 1502. For example, the registers 1518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure, such as by being distributed throughout the core 1502 to shorten access time. The second bus 1522 may be implemented by at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages.

The microprocessor 1500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1500, in the same chip package as the microprocessor 1500 and/or in one or more separate packages from the microprocessor 1500.

Figure 16:
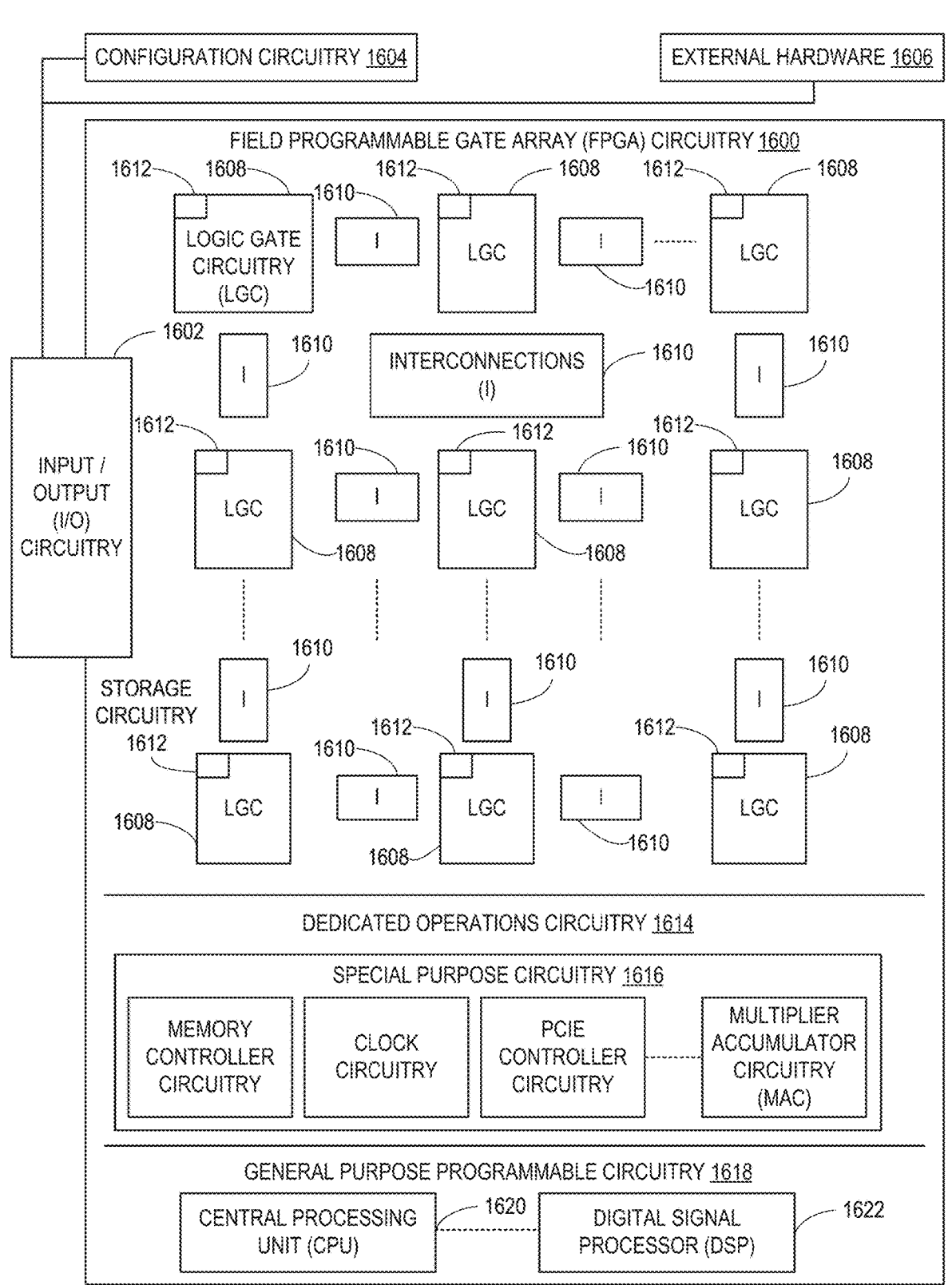
FIG. 16 is a block diagram of another example implementation of the programmable circuitry of FIG. 14.

FIG. 16 is a block diagram of another example implementation of the programmable circuitry 1412 of FIG. 14. In this example, the programmable circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1500 of FIG. 15 described above (which is a general purpose device that may be programmed to execute some or all of the machine readable instructions represented by the flowchart(s) of FIGS. 8-13 but whose interconnections and logic circuitry are fixed once fabricated), the FPGA circuitry 1600 of the example of FIG. 16 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 8-13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 8-13. As such, the FPGA circuitry 1600 may be configured and/or structured to effectively instantiate some or all of the operations/functions corresponding to the machine readable instructions of the flowchart(s) of FIGS. 8-13 as dedicated logic circuits to perform the operations/functions corresponding to those software instructions in a dedicated manner analogous to an ASIC. Therefore, the FPGA circuitry 1600 may perform the operations/functions corresponding to the some or all of the machine readable instructions of FIGS. 8-13 faster than the general-purpose microprocessor can execute the same.

In the example of FIG. 16, the FPGA circuitry 1600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain a binary file, which may be implemented by a bit stream, data, and/or machine-readable instructions, to configure the FPGA circuitry 1600, or portion(s) thereof. In some such examples, the configuration circuitry 1604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1606 may be implemented by external hardware circuitry. For example, the external hardware 1606 may be implemented by the microprocessor 1500 of FIG. 15.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to at least some of the machine readable instructions of FIGS. 8-13 and/or other desired operations. The logic gate circuitry 1608 shown in FIG. 16 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations/functions. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example dedicated operations circuitry 1614. In this example, the dedicated operations circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the programmable circuitry 1412 of FIG. 14, many other approaches are contemplated. For example, FPGA circuitry may include an on-board CPU, such as one or more of the example CPU 1620 of FIG. 15. Therefore, the programmable circuitry 1412 of FIG. 14 may additionally be implemented by combining at least the example microprocessor 1500 of FIG. 15 and the example FPGA circuitry 1600 of FIG. 16. In some such hybrid examples, one or more cores 1502 of FIG. 15 may execute a first portion of the machine readable instructions represented by the flowchart(s) of FIGS. 8-13 to perform first operation(s)/function(s), the FPGA circuitry 1600 of FIG. 16 may be configured and/or structured to perform second operation(s)/function(s) corresponding to a second portion of the machine readable instructions represented by the flowcharts of FIG. 8-13, and/or an ASIC may be configured and/or structured to perform third operation(s)/function(s) corresponding to a third portion of the machine readable instructions represented by the flowcharts of FIGS. 8-13.

It should be understood that some or all of the circuitry of FIGS. 1-3 may, thus, be instantiated at the same or different times. For example, same and/or different portion(s) of the microprocessor 1500 of FIG. 15 may be programmed to execute portion(s) of machine-readable instructions at the same and/or different times. In some examples, same and/or different portion(s) of the FPGA circuitry 1600 of FIG. 16 may be configured and/or structured to perform operations/functions corresponding to portion(s) of machine-readable instructions at the same and/or different times.

In some examples, some or all of the circuitry of FIGS. 1-3 may be instantiated, for example, in one or more threads executing concurrently and/or in series. For example, the microprocessor 1500 of FIG. 15 may execute machine readable instructions in one or more threads executing concurrently and/or in series. In some examples, the FPGA circuitry 1600 of FIG. 16 may be configured and/or structured to carry out operations/functions concurrently and/or in series. Moreover, in some examples, some or all of the circuitry of FIGS. 1-3 may be implemented within one or more virtual machines and/or containers executing on the microprocessor 1500 of FIG. 15.

In some examples, the programmable circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the programmable circuitry 1412 of FIG. 14, which may be in one or more packages. For example, the XPU may include a CPU (e.g., the microprocessor 1500 of FIG. 15, the CPU 1620 of FIG. 16, etc.) in one package, a DSP (e.g., the DSP 1622 of FIG. 16) in another package, a GPU in yet another package, and an FPGA (e.g., the FPGA circuitry 1600 of FIG. 16) in still yet another package.

Figure 17:
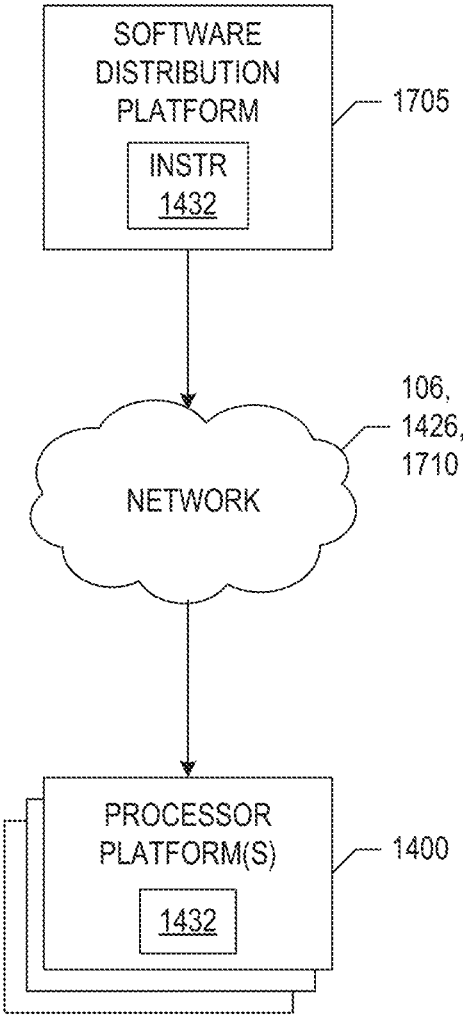
FIG. 17 is a block diagram of an example software/firmware/instructions distribution platform (e.g., one or more servers) to distribute software, instructions, and/or firmware (e.g., corresponding to the example machine readable instructions of FIGS. 8-13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1432 of FIG. 14 to other hardware devices (e.g., hardware devices owned and/or operated by third parties from the owner and/or operator of the software distribution platform) is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1432, which may correspond to the example machine readable instructions of FIGS. 8-13, as described above. The one or more servers of the example software distribution platform 1705 are in communication with an example network 1710, which may correspond to any one or more of the Internet and/or any of the example networks described above (e.g., the network 106 of FIG. 1, the network 1426 of FIG. 14). In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432 from the software distribution platform 1705. For example, the software, which may correspond to the example machine readable instructions of FIG. 8-13, may be downloaded to the example programmable circuitry platform 1400, which is to execute the machine readable instructions 1432 to implement the product recognition circuitry 104. In some examples, one or more servers of the software distribution platform 1705 periodically offer, transmit, and/or force updates to the software (e.g., the example machine readable instructions 1432 of FIG. 14) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that recognize products in images using visual and textual information. Example product recognition disclosed herein includes applications of (a) CV techniques to detect and classify product facings in a shelf image. (b) information retrieval techniques to retrieve product characteristics corresponding to the classified product facings, and (c) NLP techniques to extract text that is to be compared to the retrieved product characteristics. Examples disclosed herein apply techniques to combine text-based confidence scores and image-based confidence scores to improve an accuracy, efficiency, and effectiveness of a recognition process.

Examples disclosed herein combine visual and textual features of an image with product characteristics to improve product recognition of fine-grained products, (e.g., products that are very similar and where the image-based object classifier is not able to discriminate). Example systems and methods disclosed herein can significantly reduce the amount of human intervention required to review results of an automatic image recognition to deliver better predictions and/or to increase cost savings.

Disclosed systems, apparatus, articles of manufacture, and methods improve the efficiency of using a computing device by improving an accuracy and an efficiency of a recognition process, reducing computation waste by preventing a need for review of the predictions. Examples disclosed herein combine visual and textual features of an image with product characteristics to improve product recognition. Disclosed systems, apparatus, articles of manufacture, and methods are accordingly directed to one or more improvement(s) in the operation of a machine such as a computer or other electronic and/or mechanical device.

Example methods, systems, articles of manufacture, and apparatus to detect products using visual and textual information are disclosed herein. Further examples and combinations thereof include the following:

Example 1 includes an apparatus comprising interface circuitry to obtain a shelf image; computer readable instructions; and programmable circuitry to instantiate classification circuitry to classify object facings detected in the shelf image to determine object candidates corresponding to a first object, ones of the object candidates to include a respective image-based metric; cluster circuitry to assign first words extracted from the shelf image to the first object facing; rank adjuster circuitry to generate text-based metrics for the object candidates by comparing respective object characteristics of the object candidates to the first words, ones of the text-based metrics corresponding to respective ones of the object candidates; and prediction circuitry to determine final metrics for the object candidates by selecting, for the ones of the object candidates. (a) a respective image-based metric or (b) a combination of the respective image-based metric and a respective text-based metric; and rank the object candidates based on the final metrics.

Example 2 includes the apparatus of example 1, wherein the programmable circuitry is to instantiate data retriever circuitry to retrieve the object characteristics of the object candidates from a database.

Example 3 includes the apparatus of any one of examples 1-2, wherein the programmable circuitry is to instantiate rank adjuster circuitry to select first object characteristics corresponding to a first object candidate, the first object characteristics including second words; remove ones of the second words having a respective edit distance relative to ones of the first words extracted from the shelf image that exceeds a threshold edit distance; and determine a first text similarity metric corresponding to the first object candidate by weighing remaining ones of the second words by a respective numerical importance metric.

Example 4 includes the apparatus of example 3, wherein the edit distances are based on Levenshtein distances.

Example 5 includes the apparatus of example 3, wherein the numerical importance metric is a term frequency-inverse document frequency factor.

Example 6 includes the apparatus of any ones of examples 3-6, wherein the programmable circuitry is to instantiate the classification circuitry to determine two object candidates for the first object, the two object candidates including the first object candidate and a second object candidate; and the programmable circuitry is to instantiate the rank adjuster circuitry to determine a second text similarity metric corresponding to the second object candidate; identify a maximum of the first text similarity metric and the second text similarity metric; and divide each of the first text similarity metric and the second text similarity metric by the maximum of the first text similarity metric and the second text similarity metric to generate the text-based metrics.

Example 7 includes the apparatus of any ones of examples 1-6, wherein the programmable circuitry is to instantiate the prediction circuitry to calculate the combination of the respective image-based metric and the respective text-based metric based on a harmonic mean.

Example 8 includes the apparatus of any ones of examples 1-7, wherein the object candidates include at least one of retail products, warehouse packages, or pharmaceutical packages.

Example 9 includes the apparatus of any ones of examples 1-8, wherein the programmable circuitry includes one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to machine-readable data, and one or more registers to store a result of the one or more first operations, the machine-readable data in the apparatus;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations.

Example 10 includes at least one non-transitory machine readable storage medium comprising instructions to cause programmable circuitry to at least classify object facings detected in an image to predict object candidates corresponding to a first object depicted in the image, ones of the object candidates to include a respective image-based score; group first words extracted from the image, the first words corresponding to the first object facing; generate text-based scores for the object candidates by comparing respective object characteristics of the object candidates to the first words, ones of the text-based scores corresponding to respective ones of the object candidates; determine final scores for the object candidates by selecting, for the ones of the object candidates, (a) a respective image-based score or (b) a combination of the respective image-based score and a respective text-based score; and arrange the object candidates based on the final scores.

Example 11 includes the non-transitory machine readable storage medium of example 10, wherein the instructions are to cause the programmable circuitry to retrieve the object characteristics corresponding to the object candidates from a database.

Example 12 includes the non-transitory machine readable storage medium of any ones of examples 10-11, wherein the object candidates include a first object candidate, the instructions are to cause the programmable circuitry to select first object characteristics corresponding to the first object candidate, the first object characteristics including second words; remove ones of the second words having a respective edit distance relative to ones of the first words extracted from the image that exceeds a threshold edit distance; and determine a first text similarity metric corresponding to the first object candidate by weighing remaining ones of the second words by a respective numerical importance metric.

Example 13 includes the non-transitory machine readable storage medium of example 12, wherein the edit distances are based on Levenshtein distances.

Example 14 includes the non-transitory machine readable storage medium of example 12, wherein the numerical importance metric is a term frequency-inverse document frequency factor.

Example 15 includes the non-transitory machine readable storage medium of any ones of examples 12-14, wherein the object candidates include the first object candidate and a second object candidate, the instructions are to cause the programmable circuitry to determine a second text similarity metric corresponding to the second object candidate; identify a maximum of the first text similarity metric and the second text similarity metric; and divide each of the first text similarity metric and the second text similarity metric by the maximum of the first text similarity metric and the second text similarity metric to generate the text-based scores.

Example 16 includes the non-transitory machine readable storage medium of any ones of examples 10-15, wherein the instructions are to cause the programmable circuitry to calculate the combination of the image-based score and the respective text-based score using a harmonic mean.

Example 17 includes the non-transitory machine readable storage medium of any ones of examples 10-16, wherein the object candidates include at least one of retail products, warehouse packages, or pharmaceutical packages.

Example 18 includes a method comprising classifying, by executing an instruction with programmable circuitry, object packaging detected in a shelf image to determine object candidates corresponding to a first object, ones of the object candidates to include a respective first metric, the first metric based on visual features of the object packaging; associating, by executing an instruction with the programmable circuitry, first words extracted from the shelf image to the first object packaging; generating, by executing an instruction with the programmable circuitry, second metrics for the object candidates by comparing respective object characteristics of the object candidates to the first words, the second metrics based on text, ones of the second metrics corresponding to respective ones of the object candidates; determining, by executing an instruction with the programmable circuitry, third metrics for the object candidates by selecting, for the ones of the object candidates, (a) a respective first metric or (b) a combination of the respective first metric and a respective second metric; and sorting, by executing an instruction with the programmable circuitry, the object candidates based on the third metrics.

Example 19 includes the method of example 18, further including retrieving the object characteristics of the object candidates from a database.

Example 20 includes the method of any ones of examples 18-20, wherein the object candidates for the first object include a first object candidate, the method includes selecting first ones of the object characteristics, the first ones of the object characteristics corresponding to a first object candidate, the first ones of the object characteristics including second words; removing ones of the second words having a respective edit distance relative to ones of the first words extracted from the shelf image that exceeds a threshold edit distance; and determining a first text similarity metric corresponding to the first object candidate by weighing remaining ones of the second words by a respective numerical importance metric.

Example 21 includes the method of example 20, wherein the edit distances are based on Levenshtein distances.

Example 22 includes the method of example 20, wherein the numerical importance metric is a term frequency-inverse document frequency factor.

Example 20 includes the method of any ones of examples 19-22, wherein the object candidates for the first object include the first object candidate and a second object candidate, the method further includes determining a second text similarity metric corresponding to the second object candidate; identifying a maximum of the first text similarity metric and the second text similarity metric; and dividing each of the first text similarity metric and the second text similarity metric by the maximum of the first text similarity metric and the second text similarity metric to generate the second metrics.

Example 24 includes the method of any ones of examples 18-23, wherein the determining of the combination of the first metric and the respective second metric includes calculating a harmonic mean between the first metric and the respective second metric.

Example 25 includes the method of any ones of examples 18-24, wherein the object candidates include at least one of retail products, warehouse packages, or pharmaceutical packages.

Example 26 includes an apparatus comprising interface circuitry to obtain a shelf image; machine readable instructions; and programmable circuitry to at least one of instantiate or execute the machine readable instructions to identify first words extracted from the shelf image, the first words corresponding to a product frame; generate a first set of words corresponding to a first product candidate and a second set of words corresponding to a second product candidate; determine respective text-based scores for the first and second product candidates, the respective text-based scores to represent similarities of the first and second sets of words relative to the words extracted from the shelf image; and determine final scores for the first and second product candidates, the final scores to be based on a respective maximum of (a) an image-based confidence score of a respective product candidates, and (b) a mean of a respective image-based confidence score and a respective text-based score.

Example 27 includes the apparatus of example 26, wherein the programmable circuitry is to at least one of instantiate or execute the machine readable instructions to analyze the shelf image to determine the product candidates corresponding to a first product in the shelf image, the product candidates to include the first product candidate having a first confidence score and the second product candidate having a second confidence score.

Example 28 includes the apparatus of example 27, wherein the programmable circuitry is to at least one of instantiate or execute the machine readable instructions to determine a first image-based score for the first product candidate and a first image-based score for the second product candidate.

Example 29 includes the apparatus of any ones of examples 26-28, wherein the programmable circuitry is to at least one of instantiate or execute the machine readable instructions to extract a first product description corresponding to the first product candidate and a second product description corresponding to the second product candidate.

Example 30 includes the apparatus of example 29, wherein the first product description is based on first product characteristics extracted from a products database and the second product description is based on second product characteristics extracted from the products database.

Example 31 includes the apparatus of any ones of examples 29-30, wherein the first set of words is based on the first product description and the second set of words is based on the second product description.

Example 32 includes the apparatus of any ones of examples 26-31, wherein the shelf image includes product facings, and wherein the programmable circuitry is to at least one of instantiate or execute the machine readable instructions to detect the product facings; group ones of the product facings that correspond to the first product; and generate a first product bounding box corresponding to the first product, the first product bounding box to bound the ones of the product facings.

Example 33 includes the apparatus of any ones of examples 29-32, wherein the programmable circuitry is to at least one of instantiate or execute the machine readable instructions to apply an optical character recognition (OCR) algorithm to the shelf image to extract words from the shelf image, each word of the words to include a respective text string and a respective word bounding box; and assign first words of the words to the first product bounding box based on coordinates of the word bounding boxes.

Example 34 includes the apparatus of any ones of examples 29-33, wherein the programmable circuitry is to at least one of instantiate or execute the machine readable instructions to assign the first words to the first product bounding box based on intersection over union calculations.

Example 35 includes the apparatus of any ones of examples 29-34, wherein the programmable circuitry is to at least one of instantiate or execute the machine readable instructions to assign first words of the words to the first product bounding box when respective ones of the word bounding boxes have a center coordinate within bounds of the first product bounding box.

Example 36 includes the apparatus of any ones of examples 29-35, wherein the programmable circuitry is to at least one of instantiate or execute the machine readable instructions to remove first ones of the words extracted from the shelf image having an OCR confidence score that is below is threshold level of confidence; remove second ones of the words extracted from the shelf image having less than a threshold number of characters; and remove non-standard characters and punctations from the ones of the words extracted from the shelf image.

Example 37 includes the apparatus of any ones of examples 29-36, wherein the product word set includes discriminative words corresponding to the first product.

Example 38 includes the apparatus of any ones of examples 29-37, wherein the programmable circuitry is to at least one of instantiate or execute the machine readable instructions to apply an image-based object detection model to the shelf image to detect regions of interest corresponding to facings of the first product.

Example 39 includes the apparatus of any ones of examples 29-38, wherein the programmable circuitry is to at least one of instantiate or execute the machine readable instructions to apply an image-based object classification model to the detected regions of interest corresponding to facings of the first product to determine the product candidates.

Example 40 includes the apparatus of any ones of examples 26-39, wherein the programmable circuitry is to at least one of instantiate or execute the machine readable instructions to generate a final ranked set of the product candidates based on the final scores.

Example 41 includes the apparatus of any ones of examples 26-40, wherein the programmable circuitry is to at least one of instantiate or execute the machine readable instructions to generate an image-based ranked set of the product candidates based on the image-based scores.

Example 42 includes the apparatus of any ones of examples 26-41, wherein the programmable circuitry is to at least one of instantiate or execute the machine readable instructions to generate a text-based ranked set of the product candidates based on the text-based scores.

Example 43 includes a non-transitory machine readable storage medium comprising instructions to cause programmable circuitry to at least assign first words to a grid region based on coordinates of first text boxes associated with the first words and coordinates of the grid region, the grid region associated with a first product; retrieve a first product description corresponding to a first product candidate and a second product description corresponding to a second product candidate, the first and second product candidates to correspond to the first product; and select the first product candidate or the second product candidate based on confidence scores of the first and second product candidates.

Example 44 includes an apparatus means for recognizing an object to: detect facings depicted in an image, the facings including a first facing corresponding to a first product; classify the first facing to generate a set of product candidates for the first product, the set of product candidates including (a) first product candidate, the first product candidate associated with a first image-based confidence score and (b) a second product candidate, the second product candidate associated with a second image-based confidence score; means for generating a multiset of words to generate a first multiset of words corresponding to the first product candidate and a second multiset of words corresponding to the second product candidate; means for determining text similarity to: perform a first comparison of the first multiset of words relative to first words extracted from the image to generate a first text-based confidence score for the first product candidate, the first words associated with the first facing; perform a second comparison of the second multiset of words relative to the first words to generate a second text-based confidence score for the second product candidate; and means for merging predicting to associate one of the first product candidate or the second product candidate based on the first and second image-based confidence scores and the first and second text-based confidence scores.

Example 45 includes the apparatus of example 44, further including means for generating a grid to generate a first product frame surrounding ones of the facings corresponding to the first product, the ones of the facings including the first facing.

Example 46 includes the apparatus of example 45, wherein the recognizing means is to detect second facings corresponding to a second product and third facings corresponding to a third product, the grid generating means is to generate a second product frame surrounding the second product facings; generate a third product frame surrounding the third product facings; and superimpose a grid on the image, the grid to be based on at least the first product frame, the second product frame, and the third product frame.

Example 47 includes the apparatus of example 46, wherein the grid generating means is to obtain machine-readable text extracted from the image, the machine-readable text including the first words, second words, and third words; assign the first words to the first product frame based on coordinates of bounding boxes surrounding the first words and coordinates of the first product frame; assign the second words to the second product frame based on coordinates of bounding boxes surrounding the second words and coordinates of the second product frame; and assign the third words to the third product frame based on coordinates of bounding boxes surrounding the third words and coordinates of the third product frame.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
interface circuitry to obtain a shelf image;
machine-readable instructions; and
at least one programmable circuit to be programmed by the machine-readable instructions to:
classify object facings detected in the shelf image to determine object candidates corresponding to a first object, ones of the object candidates to include a respective image-based metric;
assign first words extracted from the shelf image to a first one of the object facings;
generate text-based metrics for the object candidates by comparing respective object characteristics of the object candidates to the first words, ones of the text-based metrics corresponding to respective ones of the object candidates;
determine final metrics for the object candidates by selecting, for the ones of the object candidates, (a) a respective image-based metric or (b) a combination of the respective image-based metric and a respective text-based metric; and
rank the object candidates based on the final metrics.

2. The apparatus of claim 1, wherein one or more of the at least one programmable circuit is to retrieve the object characteristics of the object candidates from a database.

3. The apparatus of claim 1, wherein one or more of the at least one programmable circuit is to:
select first ones of the object characteristics corresponding to a first object candidate of the object candidates, the first ones of the object characteristics including second words;
remove ones of the second words having a respective edit distance relative to ones of the first words extracted from the shelf image that exceeds a threshold edit distance; and
determine a first text similarity metric corresponding to the first object candidate by weighing remaining ones of the second words by a respective numerical importance metric.

4. The apparatus of claim 3, wherein the edit distances are based on Levenshtein distances.

5. The apparatus of claim 3, wherein the numerical importance metric is a term frequency-inverse document frequency factor.

6. The apparatus of claim 3, wherein one or more of the at least one programmable circuit is to;
determine two object candidates for the first object, the two object candidates including the first object candidate and a second object candidate;

determine a second text similarity metric corresponding to the second object candidate;

identify a maximum of the first text similarity metric and the second text similarity metric; and divide each of the first text similarity metric and the second text similarity metric by the maximum of the first text similarity metric and the second text similarity metric to generate the text-based metrics.

7. The apparatus of claim 1, wherein one or more of the at least one programmable circuit is to calculate the combination of the respective image-based metric and the respective text-based metric based on a harmonic mean.

8. The apparatus of claim 1, wherein the object candidates include at least one of retail products, warehouse packages, or pharmaceutical packages.

9. The apparatus of claim 1, wherein one or more of the at least one programmable circuit includes one or more of:

at least one of a central processor unit, a graphics processor unit, or a digital signal processor;

a Field Programmable Gate Array (FPGA); or

Application Specific Integrated Circuitry (ASIC).

10. At least one non-transitory machine-readable storage medium comprising machine-readable instructions to cause at least one programmable circuit to at least:

classify object facings detected in an image to predict object candidates corresponding to a first object depicted in the image, ones of the object candidates to include a respective image-based score;

group first words extracted from the image, the first words corresponding to a first one of the object facings;

generate text-based scores for the object candidates by comparing respective object characteristics of the object candidates to the first words, ones of the text-based scores corresponding to respective ones of the object candidates;

determine final scores for the object candidates by selecting, for the ones of the object candidates, (a) a respective image-based score or (b) a combination of the respective image-based score and a respective text-based score; and arrange the object candidates based on the final scores.

11. The non-transitory machine-readable storage medium of claim 10, wherein the machine-readable instructions are to cause one or more of the at least one programmable circuit to retrieve the object characteristics corresponding to the object candidates from a database.

12. The non-transitory machine-readable storage medium of claim 10, wherein the object candidates include a first object candidate, the machine-readable instructions are to cause one or more of the at least one programmable circuit to:

select first ones of the object characteristics corresponding to the first object candidate, the first ones of the object characteristics including second words;

remove ones of the second words having a respective edit distance relative to ones of the first words extracted from the image that exceeds a threshold edit distance; and determine a first text similarity metric corresponding to the first object candidate by weighing remaining ones of the second words by a respective numerical importance metric.

13. The non-transitory machine-readable storage medium of claim 12, wherein the edit distances are based on Levenshtein distances.

14. The non-transitory machine-readable storage medium of claim 12, wherein the numerical importance metric is a term frequency-inverse document frequency factor.

15. The non-transitory machine-readable storage medium of claim 12, wherein the object candidates include the first object candidate and a second object candidate, the machine-readable instructions are to cause one or more of the at least one programmable circuit to:

determine a second text similarity metric corresponding to the second object candidate;

identify a maximum of the first text similarity metric and the second text similarity metric; and divide each of the first text similarity metric and the second text similarity metric by the maximum of the first text similarity metric and the second text similarity metric to generate the text-based scores.

16. The non-transitory machine-readable storage medium of claim 10, wherein the machine-readable instructions are to cause one or more of the at least one programmable circuit to calculate the combination of the respective image-based score and the respective text-based score for a first one of the object candidates using a harmonic mean.

17. The non-transitory machine-readable storage medium of claim 10, wherein the object candidates include at least one of retail products, warehouse packages, or pharmaceutical packages.

18. A method comprising:

classifying, by at least one programmable circuit programmed by at least one instruction, object packaging detected in a shelf image to determine object candidates corresponding to a first object, ones of the object candidates to include a respective first metric, the first metric based on visual features of the object packaging;

associating, by one or more of the at least one programmable circuit, first words extracted from the shelf image to a first one of the object packaging;

generating, by one or more of the at least one programmable circuit, second metrics for the object candidates by comparing respective object characteristics of the object candidates to the first words, the second metrics based on text, ones of the second metrics corresponding to respective ones of the object candidates;

determining, by one or more of the at least one programmable circuit, third metrics for the object candidates by selecting, for the ones of the object candidates, (a) a respective first metric or (b) a combination of the respective first metric and a respective second metric; and sorting, by one or more of the at least one programmable circuit, the object candidates based on the third metrics.

19. The method of claim 18, further including retrieving the object characteristics of the object candidates from a database.

20. The method of claim 18, wherein the object candidates for the first object include a first object candidate, the method includes:

selecting first ones of the object characteristics, the first ones of the object characteristics corresponding to the first object candidate, the first ones of the object characteristics including second words;

removing ones of the second words having a respective edit distance relative to ones of the first words extracted from the shelf image that exceeds a threshold edit distance; and determining a first text similarity metric corresponding to the first object candidate by weighing remaining ones of the second words by a respective numerical importance metric.

* * * * *